(12) United States Patent
Rojas-Cessa et al.

(10) Patent No.: US 8,675,673 B2
(45) Date of Patent: Mar. 18, 2014

(54) FORWARDING CELLS OF PARTITIONED DATA THROUGH A THREE-STAGE CLOS-NETWORK PACKET SWITCH WITH MEMORY AT EACH STAGE

(75) Inventors: Roberto Rojas-Cessa, Brooklyn, NY (US); Zigian Dong, Kearny, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 1087 days.

(21) Appl. No.: 12/511,424

(22) Filed: Jul. 29, 2009

(65) Prior Publication Data

US 2011/0026539 A1    Feb. 3, 2011

(51) Int. Cl.
*H04L 12/28*    (2006.01)
*H04L 12/50*    (2006.01)
*H04Q 11/00*    (2006.01)
*H04L 12/56*    (2011.01)

(52) U.S. Cl.
USPC ........... 370/412; 370/360; 370/386; 370/388; 370/389; 370/395.7

(58) Field of Classification Search
None
See application file for complete search history.

(56) References Cited

U.S. PATENT DOCUMENTS

| | | | |
|---|---|---|---|
| 6,101,190 A | 8/2000 | Song | |
| 6,907,041 B1 * | 6/2005 | Turner et al. | 370/412 |
| 6,940,851 B2 | 9/2005 | Oki et al. | |
| 6,961,342 B1 | 11/2005 | Uzun et al. | |
| 7,006,514 B2 | 2/2006 | Oki et al. | |
| 7,046,661 B2 | 5/2006 | Oki et al. | |
| 7,103,056 B2 | 9/2006 | Chao et al. | |
| 7,173,931 B2 | 2/2007 | Chao et al. | |
| 7,342,887 B1 | 3/2008 | Sindhu et al. | |
| 7,535,893 B1 | 5/2009 | Beladakere et al. | |
| 7,843,908 B2 | 11/2010 | Rojas-Cessa et al. | |
| 2002/0061028 A1 | 5/2002 | Chao et al. | |
| 2002/0147851 A1 | 10/2002 | Morimura et al. | |
| 2003/0021266 A1 | 1/2003 | Oki et al. | |
| 2004/0081184 A1 | 4/2004 | Magill et al. | |

(Continued)

FOREIGN PATENT DOCUMENTS

| | | |
|---|---|---|
| JP | H10271110 A | 10/1998 |
| JP | 2000196609 A | 7/2000 |

(Continued)

OTHER PUBLICATIONS

Eiji Oki, Zhigang Jing, Roberto Rojas-Cessa, H. Jonathan Chao, Concurrent Round-Robin-Based Dispatching Schemes for Clos-Network Switches, IEEE/ACM Trans. Networking, May 2001, pp. 830-840, vol. 10 No. 6, USA.

(Continued)

*Primary Examiner* — Ayaz Sheikh
*Assistant Examiner* — Sori Aga
(74) *Attorney, Agent, or Firm* — Turk IP Law, LLC

(57) ABSTRACT

Examples are disclosed for forwarding cells of partitioned data through a three-stage memory-memory-memory (MMM) input-queued Clos-network (IQC) packet switch. In some examples, each module of the three-stage MMM IQC packet switch includes a virtual queue and a manager that are configured in cooperation with one another to forward a cell from among cells of partitioned data through at least a portion of the switch. The cells of partitioned data may have been partitioned and stored at an input port for the switch and have a destination of an output port for the switch.

7 Claims, 19 Drawing Sheets

(56) References Cited

U.S. PATENT DOCUMENTS

| | | | |
|---|---|---|---|
| 2004/0085967 A1 | 5/2004 | Boduch et al. | |
| 2005/0002334 A1* | 1/2005 | Chao et al. | 370/230 |
| 2005/0025141 A1 | 2/2005 | Chao et al. | |
| 2005/0226551 A1 | 10/2005 | Pichler et al. | |
| 2007/0053356 A1 | 3/2007 | Konda | |
| 2007/0140232 A1 | 6/2007 | Carson | |
| 2008/0212472 A1* | 9/2008 | Musacchio et al. | 370/232 |
| 2008/0303628 A1 | 12/2008 | Rojas-Cessa et al. | |
| 2009/0262744 A1 | 10/2009 | Fraser | |
| 2010/0202460 A1 | 8/2010 | Park et al. | |
| 2010/0238949 A1 | 9/2010 | Passas et al. | |
| 2010/0316061 A1 | 12/2010 | Rojas-Cessa et al. | |
| 2010/0329249 A1 | 12/2010 | Shenoy et al. | |
| 2011/0026532 A1 | 2/2011 | Rojas-Cessa et al. | |
| 2011/0167191 A1 | 7/2011 | Olesinski et al. | |

FOREIGN PATENT DOCUMENTS

| | | |
|---|---|---|
| JP | 2001045026 A | 2/2001 |
| JP | 2005045626 A | 2/2005 |
| WO | 03081944 A1 | 10/2003 |
| WO | 2007078824 A2 | 7/2007 |
| WO | 20081154390 A1 | 12/2008 |

OTHER PUBLICATIONS

Chuan-Bi Lin, Roberto Rojas-Cessa, Module Matching Schemes for Input-Queued Clos-Network Switches, IEEE 2006 Communication Letters, Feb. 1992, pp. 194-196, vol. 11 No. 2, USA.

Roberto Rojas-Cessa, Eiji Oki, H. Jonathan Chao, CIXB-1: Combined Input-One-cell-crosspoint Buffered Switch, Proceedings of IEEE Workshop on High Performance Switching and Routing, May 29-31 2001, pp. 324-329, Dallas, TX, USA.

Mark J. Karol, Michael G. Hluchyj, Queuing in High-performance Packet-switching, IEEE Journal on Selected Areas of Communications, Dec. 1988, vol. 6, pp. 1587-1597.

Nick McKeown, Adisak Mekkittikul, Venkat Anantharam, Jean Walrand, Achieving 100% Throughput in an Input-queued Switch, IEEE Transactions on Communications., Aug. 1999, vol. 47 No. 8, pp. 1260-1267.

Scott et al., The BlackWidow High-Radix Clos Network, Proceedings of the 33rd International Symposium on Computer Architecture (ISCA '06), IEEE 2006, pp. 1-12.

Oki et al, Concurrent Round-Robin Dispatching Scheme in a Clos-Network Switch, IEEE 2001, pp. 107-111.

Rojas-Cessa et al., Maximum Weight Matching Dispatching Scheme in Buffered Clos-Network Packet Switches, IEEE Communications Society, IEEE 2004, pp. 1075-1079.

Chao, H.J., et al., "Matching_Algorithms for Three-Stage Bufferless Clos Network Switches," IEEE Communications Magazine, vol. 41, Issue. 10, pp. 46-54, Oct. 2003.

Rojas-Cessa, R., et al., "Scalable Two-Stage Clos Network Switch and Module-First Matching," (2006), IEEE, pp. 6.

Lin, C.B., et al., "Module Matching Schemes for Input-Queued Clos-Network Packet Switches," IEEE Communications Letters, vol. 11, Issue: 2, pp. 194-196, Feb. 2007.

Wang, F., et al., "Analysis on The Central-Stage Buffered Clos-Network for Packet Switching," ICC 2005, IEEE International Conference on Communications, vol. 2, pp. 1053-1057, May 16-20, 2005.

Lin, C.B., et al., "Module-First Matching Schemes for Scalable Input-Queued Space-Space-Space Clos Network Packet Switches," IEEE International Conference on Communications, pp. 5669-5673, May 19-23, 2008.

Krishnan, S., et al., "On Buffered Clos Switches," Columbia University Computer Science Technical Reports, pp. 54, Nov. 1, 2002.

Roberto, R.C., et al., "CIXOB-k: Combined Input-Crosspoint-Output Buffered Packet Switch," IEEE Global Telecommunications Conference, vol. 4, pp. 12, Nov. 2001.

International Search Report and Written opinion for International Application No. PCT/2010/038146, mailed on Sep. 15, 2010.

International Search Report and Written opinion for International Application No. PCT/2010/038361, mailed on Jul. 30, 2010.

International Search Report and Written opinion for International Application No. PCT/2010/038161, mailed on Aug. 4, 2010.

Clos, C., "A Study of Non-Blocking Switching Networks," The Bell System Technical Journal, pp. 406-424 (Mar. 1953).

"Ricardo's Geo-Orbit Quick-Look an easy-to-use reference chart for sat tv viewers and engineers," Global C/Ku Satellite Listings with Footprints, retrieved at www.geo-orbit.org/default.html, retrieved on Sep. 26, 2013, pp. 1-7.

Chiussi, F.M., et al., "Low-Cost Scalable Switching Solutions for Broadband Networking: The Atlanta Architecture and Chipset," IEEE Communications Magazine, vol. 35, Issue 12, pp. 44-53, Dec. 1997.

Koutoukov, V., and Stoylar, D., ""Bankir" Satellite Communication System," Proceedings of International Conference on Satellite Communications IEEE, vol. 2, pp. 183-189 (Oct. 1994).

Lee et al., "Parallel Routing Algorithm in Benes-Cios Networks," in Proc. IEEE Infocom, pp. 279-286, Mar. 24-28 (1996).

Ma, X., et al., "Analysis on Memory-Space-Memory Clos Packet Switching Network," Advanced Parallel Processing Technologies, Lecture Notes in Computer Science, vol. 4847, pp. 209-221, Springer-Verlag Berlin Heidelberg (Nov. 22, 2007).

Pun, K., and Hanmdi, M., "Distro: A Distributed Static Round-Robin Scheduling Algorithm for Bufferless Clos-Network Switches," Global Telecommunication Conference IEEE, vol. 3, pp. 2298-2302, Nov. 2002.

Rojas-Cessa, R., et al., "NeTs-NR: Networks With Extended Quality of Service Using Service Vectors," National Science Foundation Award No. 0435250, Abstract accessed at http://www.nsf.gov/awardsearch/showAward?AWD_ID=0435250, accessed on Sep. 26, 2011, pp. 1-4.

Turner,J., and Yamanaka, N., "Architectural Choices in Large Scale ATM Switches," IEICE Transactions Communication, pp. 1-28 (May 1, 1997).

European Search Report for European Patent Application No. EP 10154701, mailed on May 10, 2010, pp. 1-2, Germany.

\* cited by examiner

2000 A computer program product.

2002 A signal bearing medium.

2004 Instructions to match a link between an output module and a plurality of central modules of a three-stage Clos-network packet switch such that partitioned data is kept in sequence as the partitioned data is forwarded from one or more queues maintained at the output module to an output port coupled to the output module, the instructions, which, when executed by logic, cause the logic to:

receive a request to match a link between the output module and a first central module from among the plurality of central modules, the request associated with forwarding a first cell from among a plurality of cells to a first queue maintained at the output module, the plurality of cells partitioned from data received at an input port of the three-stage Clos-network packet switch and destined for the output port coupled to the output module, the plurality of cells forwarded toward the destination output port via an input module coupled to the plurality of central modules, the request to include an indication of an age of the first cell; or grant the request based on the indication of the age of the first cell, wherein in response to receiving an acceptance of the grant of the request, matching the link between the output module and the first central module.

| 2006 a computer-readable medium. | 2008 a recordable medium. | 2010 a communications medium. |

FIG. 20

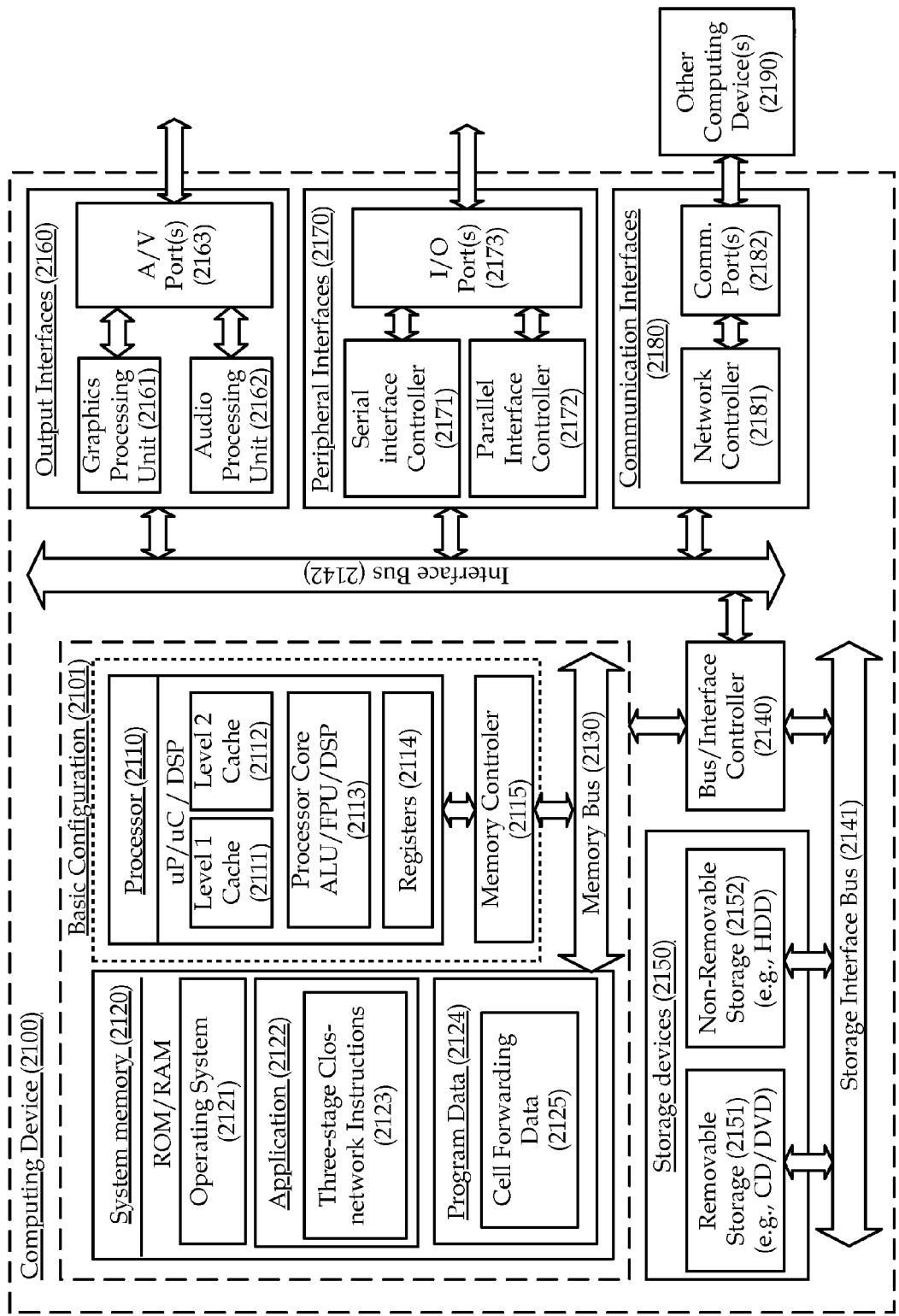

FORWARDING CELLS OF PARTITIONED DATA THROUGH A THREE-STAGE CLOS-NETWORK PACKET SWITCH WITH MEMORY AT EACH STAGE

STATEMENT REGARDING FEDERALLY SPONSORED RESEARCH OR DEVELOPMENT

This work was supported in part by National Science Foundation grant number CNS-0435250.

CROSS REFERENCE TO RELATED APPLICATIONS

This application is related to U.S. application Ser. No. 12/485,828, filed by Roberto Rojas-Cessa and Chuan-bi Lin on Jun. 16, 2009 and entitled "Configuring a Three-Stage Clos-Network Packet Switch;" and also related to U.S. application Ser. No. 12/511,814, filed by Roberto Rojas-Cessa and Ziqian Dong on Jul. 29, 2009 and entitled "Forwarding Data Through a Three-Stage Clos-Network Packet Switch."

BACKGROUND

Unless otherwise indicated herein, the approaches described in this section are not prior art to the claims in this application and are not admitted to be prior art by inclusion in this section.

A typical three-stage Clos-network packet switch includes three stages of switch modules assembled to create a packet switch capable of having a large number of ports. These three stages typically include input modules, central modules and output modules. Generally, the more input, central and output modules included in a three-stage Clos-network packet switch, the more ports the switch can support. As a result of an ability to support a variable amount of ports, a three-stage Clos-network packet switch architecture can be considered a scalable switch architecture. Due to the scalability of a three-stage Clos-network packet switch architecture, companies that manage communication networks such as Internet service providers or telecommunication service providers may use this type of architecture to scale their networks to meet customer demands.

Data received at an input port for a three-stage Clos-network packet switch may be partitioned (e.g., into cells) to facilitate movement of the data through the three-stage Clos-network packet switch. However, forwarding partitioned data through a three-stage Clos-network packet switch that has been scaled to include a large number of ports may be complex and difficult. The complexity and difficulty of forwarding the partitioned data may be increased if the partitioned data is to exit the three-stage Clos-network packet switch in the sequence in which the data may have been partitioned.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 20 illustrates a block diagram of an example computer program product; and

FIG. 21 illustrates an example computing device, all arranged in accordance with the present disclosure.

DETAILED DESCRIPTION

Figure 1:
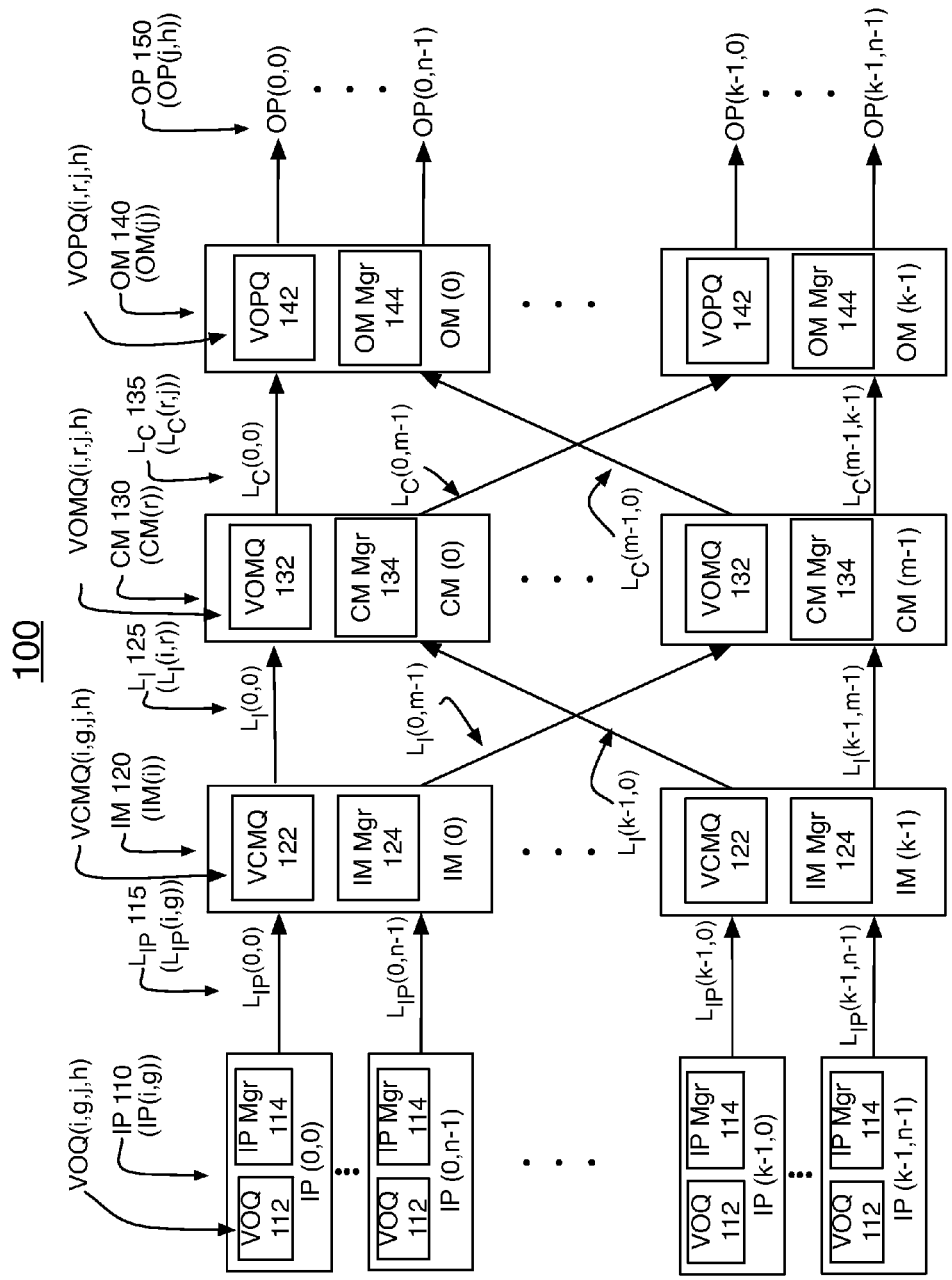
FIG. 1 illustrates an example three-stage Clos-network packet switch with a variable number of ports and modules.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to forwarding cells of partitioned data through a three-stage Clos-network packet switch having memory at each stage.

As contemplated in the present disclosure, forwarding partitioned data through a three-stage Clos-network packet switch that has been scaled to include a large number of ports may be complex and difficult if the partitioned data is to exit the three-stage Clos-network packet switch in the sequence in which the data may have been partitioned. Certain aspects of the design of a three-stage Clos-network packet switch may impact the manner in which partitioned data is forwarded. For example, a type of three-stage Clos-network packet switch design may be an input-queued Clos-network ("IQC") packet switch. An IQC packet switch may include queues or buffers that are maintained at the input ports, hereinafter referred to as virtual output queues (VOQs). These VOQs may at least temporarily store data that has been partitioned into packets or cells to facilitate internal switching or routing of data through an IQC packet switch.

As further contemplated in the present disclosure, an IQC packet switch may also include memory arranged as buffers or queues at each module. These buffers or queues at each module of the IQC packet switch may reduce complexity and timing issues associated with configuring routes to forward cells of partitioned data through the IQC packet switch. A type of IQC packet switch having memory in all stages (e.g., input module, central module and output module) can be referred to as a memory-memory-memory ("MMM") IQC packet switch. Separately maintaining buffers or queues at each module may help to resolve both internal and output link contentions. Link contentions may be resolved by allowing a separate selection of a queue storing a cell to forward the cell via a link at each stage of an MMM IQC packet switch. However, out-of-sequence problems may arise as cells of partitioned data may be forwarded through different modules via separate routes or paths to arrive at an output module coupled to a destination output port for the MMM IQC packet switch.

In some examples, methods fofororwarding cells of partitioned data through a three-stage MMM IQC packet switch are implemented. The partitioned data may have been received at an input port for the three-stage MMM IQC packet switch and destined for an output port for the three-stage MMM IQC packet switch. The cells may have also been stored in a virtual output queue (VOQ) that may be maintained at the input port and may be associated with the destination output.

According to one of the example methods, a first time stamp value is associated with a first cell from among the cells stored in the VOQ and a second time stamp value is associated with a second cell from among the cells. The first time stamp may indicate the first cell is older than the second cell. The first cell may be forwarded through the three-stage MMM IQC packet switch via an input module coupled to the input port, then via a first central module from among a plurality of central modules coupled to the input port and then via an output module coupled to the first central module and also coupled to the destination output port. The second cell may be forwarded through the three-stage MMM IQC packet switch via the input module coupled to the input port, then via a second central module from among the plurality of central modules coupled to the input port and then via the output module coupled to the second central module and also coupled to the destination output port. The first cell may then be forwarded to the destination output port from the output module prior to the second cell being forwarded to the destination output port from the output module.

FIG. 1 illustrates an example three-stage Clos-network packet switch with a variable number of ports and switch modules (e.g., a three-stage MMM IQC packet switch 100) arranged in accordance with the present disclosure. As illustrated in FIG. 1, switch 100 may include input modules ("IMs") 120 at a first stage, central modules ("CMs") 130 at a second stage, and output modules ("OMs") 140 at a third stage.

In some examples, as depicted in FIG. 1, each IM 120 may be coupled to a number (n) of input ports ("IPs") 110 via input port links ("$L_{IP}$") 115. For example, if there are a number (k) of IM 120s, there can be a total of n*k IP 110s. Similarly, each OM 140 may include a number (n) of output ports ("OPs") OM 140 may include a number (n) of output ports ("OPs") 150. For example, if there are a number (k) of OM 140's there can be a total of n*k OP 150s.

In some examples, as illustrated in FIG. 1, switch 100 may include a number of (m) CM 130s that may be arranged between a number (k) of IM 120s and a number (k) of OM 140s. Also, an IM 120 is shown as including a number (m) of outgoing input module links ("$L_I$") 125. An $L_I$ 125 may be configured to couple an IM 120 to one of the m CM 130s. Similarly, a CM 130 may include a number (k) of outgoing central module links ("$L_C$") 135. An $L_C$ 135 may be configured to couple a CM 130 with one of the k OM 140s.

In some examples, as illustrated in FIG. 1, IP 110s may separately include a VOQ 112 and an IP manager 114. VOQ 112 may be a memory structure arranged to include VOQs configured to at least temporarily store data that has been partitioned into cells to be forwarded through switch 100. In one example, a VOQ may be associated with a destination output port from among OP 150. So for example, if switch 100 included four OP 150's, VOQ 112 may be configured to include four VOQs. Also, as described more below, an IP manager 114 may include logic and/or features configured to associate a time stamp value with a cell stored in a VOQ maintained at an IP 110 and forward the cell to an IM 120 coupled to the IP 110.

In some examples, as illustrated in FIG. 1, IM 120s may separately include a virtual central module queue (VCMQ) 122 and an IM manager 124. VCMQ 122 may be a memory structure arranged to include VCMQs separately configured to at least temporarily store a cell forwarded from a VOQ maintained at an IP 110 coupled to an IM 120. A VCMQ 122 at an IM 120 may include VOMQs separately associated with VOQs maintained at IP 110s coupled to the IM 120. So for example, if switch 100 includes two IP 110s coupled to each IM 120 and each IP 110 may include four VOQs, a VCMQ 122 may be configured to include a total of eight VCMQs. Also, as described more below, IM manager 124 may include logic and/or features configured to receive cells into VCMQs included in VCMQ 122 and to also to forward the cells to one or more CM 130s.

In some examples, as illustrated in FIG. 1, CM 130s may separately include a virtual output module queue (VOMQ)

132 and a CM manager 134. VOMQ 132 may be a memory structure arranged to include VOMQs configured to at least temporarily store a cell forwarded from VCMQs maintained at IM 120s coupled to a CM 130. A VOMQ 132 at a CM 130 may include VOMQs separately associated with an IM 120 coupled to the CM 130 and may also be separately associated with a destination OP 150. So for example, if switch 100 includes two IM 110s coupled to a CM 130 and two OP 150s for each OM 140 coupled to the CM 130, VOMQ 132 may be configured to include eight VOMQs. Also, as described more below, CM manager 134 may include logic and/or features configured to receive cells into VOMQs included in VOMQ 132 and to also forward the cells to one or more OM 140s.

In some examples, as illustrated in FIG. 1, OM 140s may separately include a virtual output port queue (VOPQ) 142 and an OM manager 144. VOPQ 142 may be a memory structure arranged to include VOPQs configured to at least temporarily store a cell forwarded from VOMQs maintained at CM 130s coupled to an OM 140. A VOPQ 142 at an OM 140 may include VOPQs separately associated with both a CM 130 and an OP 150 coupled to the OM 140 and may further be separately associated with an IM 120 coupled to the CM 130. So for example, if switch 100 includes two CM 130s and two OP 150s coupled to the OM 140 and two IM 120s coupled to the two CM 130s, VOPQ 142 may be configured to include eight VOPQs. Also, as described more below, OM manager 144 may include logic and/or features configured to receive cells into VOPQs included in VOPQ 122 and to also forward one or more cells to an OP 150.

Figure 2:
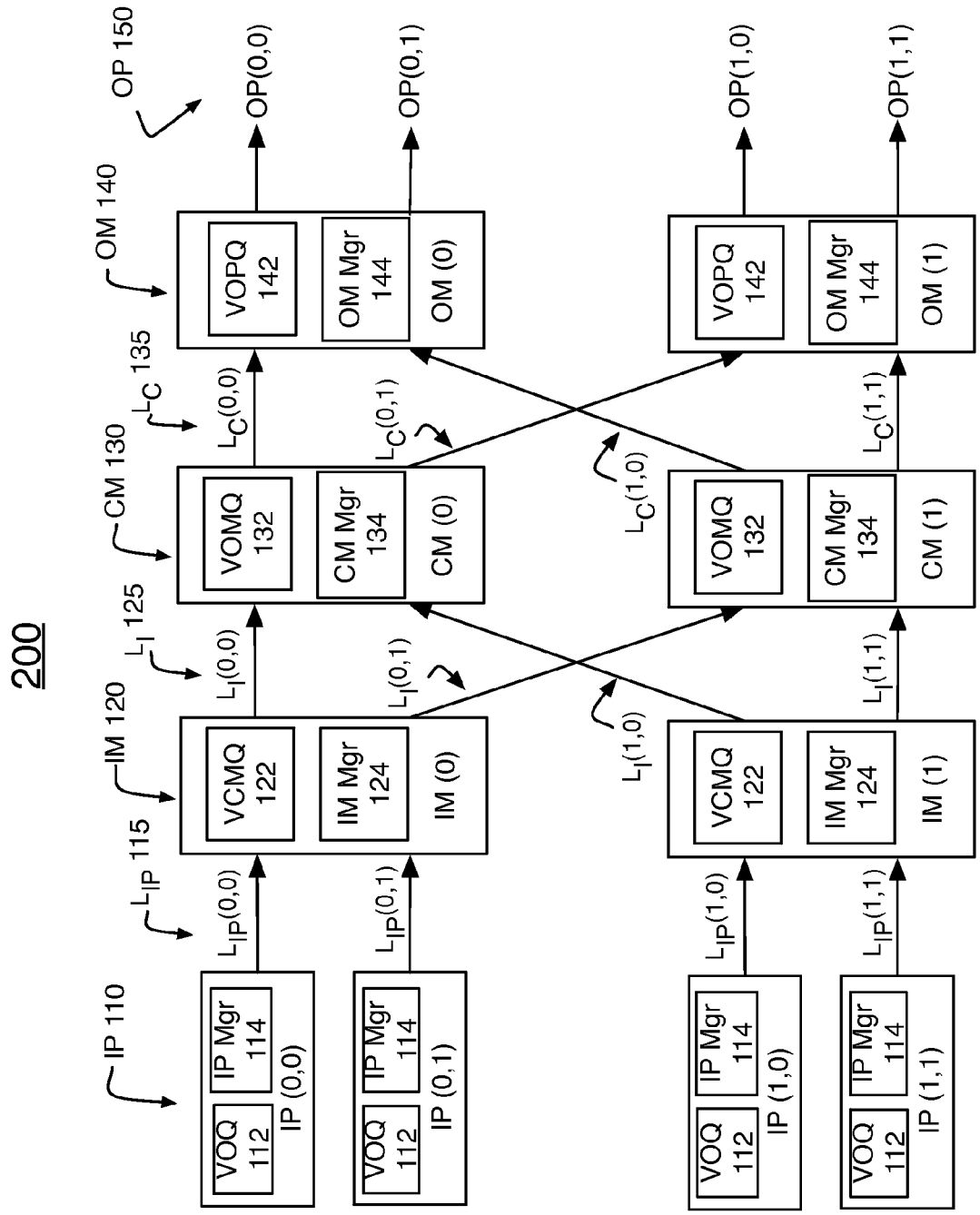
FIG. 2 illustrates an example three-stage Clos-network packet switch including a fixed number of ports and modules.

TABLE 1 includes example descriptions for the variables depicted in FIG. 1.

in TABLE 1 above. Not depicted in FIG. 2 are identifiers for VOQ(i,g,j,h), VCMQ(i,g,j,h), VOMQ(i,r,j,h) and VOPQ(i,r,j,h). Identifiers for these queues or buffers maintained at IP 110, IM 120, CM 130 and OM 140, respectively, are depicted in subsequent figures.

Figure 3:
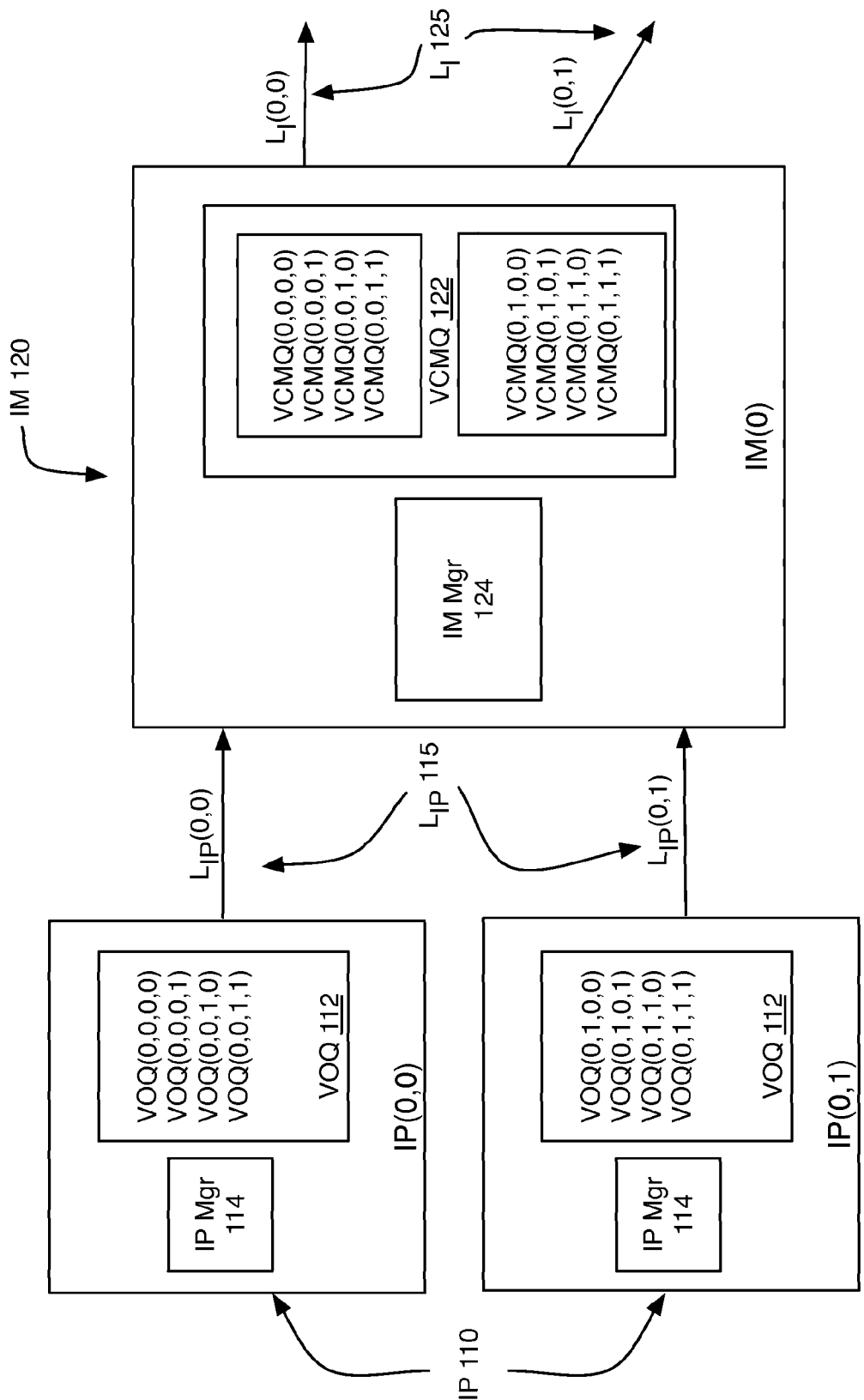
FIG. 3 illustrates a block diagram of an example of two queued input ports coupled to a queued input module for a three-stage Clos-network packet switch.

FIG. 3 illustrates a block diagram of an example of two queued input ports (e.g., IP 110s) coupled to a queued input module (e.g., IM 120) for a three-stage Clos-network packet switch (e.g., the three-stage MMM IQC packet switch 200), in accordance with the present disclosure. As illustrated in FIG. 3, the two IP 110s may include IP(0,0) and IP(0,1) coupled to IM(0) via $L_{IP}(0,0)$ and $L_{IP}(0,1)$, respectively. Also, as illustrated in FIG. 3, IM(0) may have $L_I(0,0)$ and $L_I(0,1)$. As mentioned previously for FIG. 2, IM(0) couples to CM(0) and CM(1) via $L_I(0,0)$ and $L_I(0,1)$, respectively.

As mentioned above, a VOQ maintained at an IP 110 may be associated with an OP 150. Also, FIG. 2 depicts switch 200 as including four OP 150s. So as illustrated in FIG. 3, VOQ 112 for IP(0,0) may include four VOQs and VOQ 112 for IP(0,1) may also include four VOQs. As listed in TABLE 1, a VOQ may have an identifier. For example, VOQ(0,0,0,0) may be an identifier for a VOQ maintained at IP(0,0) that may be associated with OP(0,0). Also, VOQ(0,1,0,0) may be an identifier for a VOQ maintained at IP(0,1) that may be associated with OP(0,0).

Also, as mentioned above, a VCMQ maintained at an IM 120 may be associated with a VOQ maintained at an IP 110 coupled to the IM 120. Since IM(0) couples to two IP 110s separately having four VOQs, IM(0) is illustrated in FIG. 3 as having a VCMQ 122 that includes eight VCMQs. As listed in TABLE 1, a VCMQ may have an identifier. For example,

TABLE 1 n = the number of IP 110 and OP 150 for each IM 120 and OM 140, respectively;
k = the number of IM 120s, as well as the number of OM 140s;
m = the number of CM 130s;
  IM(i) = the i+1$^{th}$ IM 120, where 0 ≤ i ≤ k−1;
  CM(r) = the r+1$^{th}$ CM 130, where 0 ≤ r ≤ m−1;
  OM(j) = the j+1$^{th}$ OM 140, where 0 ≤ j ≤ k−1;
  IP(i,g) = the (g+1)$^{th}$ IP 110 at IM(i), where 0 ≤ g ≤ n−1;
  OP(j,h) = the (h+1)$^{th}$ OP 150 at OM(j), where 0 ≤ h ≤ n−1;
  $L_{IP}(i,g)$ = the link between IP(i,g) and IM(i);
  $L_I(i,r)$ = the link between IM(i) and CM(r);
  $L_C(r,j)$ = the link between CM(r) and OM(j);
  VOQ(i,g,j,h) = VOQ maintained at IP 110 having an identifier of IP(i,g), the VOQ to store a cell destined for OP 150 with an identifier of OP(j,h);
  VCMQ(i,g,j,h) = VCMQ maintained at IM 120 to store a cell forwarded from a VOQ at an IP 110, the VOQ having an identifier of VOQ(i,g,j,h);
  VOMQ(i,r,j,h) = VOMQ maintained at CM 130 having an identifier of CM(r), the VOMQ to store a cell forwarded from IM 120 having an identifier of IM(i) and destined for OP 150 having an identifier of OP(j,h); and
  VOPQ(i,r,j,h) = VOPQ maintained at OM 140 having an identifier of OM(j), the VOPQ to store a cell forwarded from an IM 120 having an identifier of IM(i) via a CM 130 having an identifier of CM(r) and destined for OP 150 having an identifier of OP(j,h).

FIG. 2 illustrates an example three-stage Clos-network packet switch with a fixed number of ports and modules (e.g., a three-stage MMM IQC packet switch 200), arranged in accordance with the present disclosure. As shown in FIG. 2, switch 200 includes a similar architecture as described for switch 100 shown in FIG. 1, but switch 200 has fixed values for variables n, k, and m. The fixed values, for example, may be n=2, k=2 and m=2. Since, as mentioned above, N=(n*k), so N=(2*2) or 4. As a result of N=4, switch 200 is illustrated in FIG. 2 as including four IP 110s and four OP 150's. Also, since k=2 and m=2, switch 200 is illustrated as including two IM 120s, two CM 130s and two OM 140s. FIG. 2 also depicts identifiers for elements based on the fixed values of n=2, k=2 and m=2 and using the example variable descriptions shown VCMQ(0,0,0,0) may be an identifier for a VCMQ maintained at IM(0) that may be associated with VOQ(0,0,0,0) at IP(0,0). Also, VCMQ(0,1,1,1) may be an identifier for a VCMQ maintained at IM(0) that may be associated with VOQ(0,1,1,1) at IP(0,1).

Figure 4:
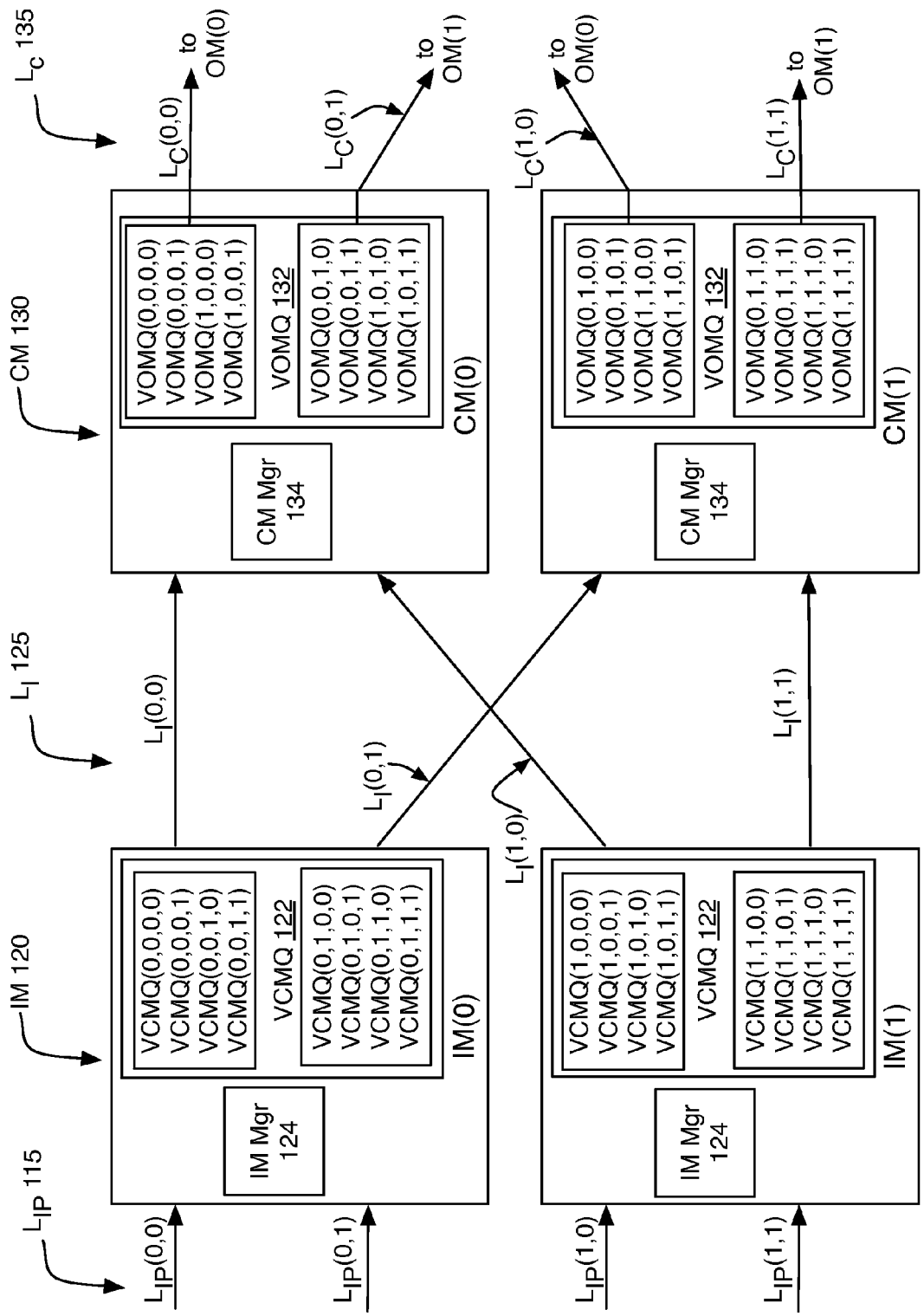
FIG. 4 illustrates a block diagram of an example of two queued input modules coupled to two queued central modules for a three-stage Clos-network packet switch.

FIG. 4 illustrates a block diagram of an example of two queued input modules (e.g., IM 120s) coupled to two queued central modules (e.g., CM 130s) for a three-stage Clos-network packet switch (e.g., the three-stage MMM IQC packet switch 200). As illustrated in FIG. 4, the two IM 120s may include IM(0) and IM(1) and the two CM 130s may include CM(0) and CM(1). As shown in FIG. 4, IM(0) may be coupled to CM(0) via $L_I(0,0)$ and to CM(1) via $L_I(0,1)$. Also, IM(1) may couple to CM(0) via $L_I(1,0)$ and to CM(1) via $L_I(1,1)$. In some examples, cells destined for OP 150s coupled to OM(0) or OM(1) may be forwarded from CM(0) via $L_C(0,0)$ or $L_C(0,1)$, respectively. Also, cells destined for OP 150s coupled to OM(0) or OM(1) may be forwarded from CM(1) via $L_C(1,0)$ or $L_C(1,1)$, respectively.

As described above for FIG. 3, IM(0) may include a VCMQ 122 having eight VCMQs. The eight VCMQs may be separately associated with VOQs maintained at IP(0,0) and at IP(0,1). Similarly, as shown in FIG. 4, IM(1) may include a VCMQ 122 having eight VCMQs. These eight VCMQs may be separately associated with VOQs maintained at IP(1,0) and at IP(1,1).

As mentioned above for FIG. 1, a VOMQ maintained at a CM 130 may be separately associated with an IM 120 coupled to the CM 130 and may also be separately associated with a destination OP 150. Since FIG. 4 depicts CM(0) and CM(1) separately coupling to two IM 120s and FIG. 2 depicts switch 200 including two OP 150s coupled to each OM 140, CM(0) and CM(1) may each have a total of eight VOMQs. As listed in TABLE 1, a VOMQ may have an identifier. For example, VOMQ(0,0,0,1) may be an identifier for a VOMQ maintained at CM(0) that may store a cell forwarded from IM(0) with a destination of OP(0,1). Similarly, VOMQ(1,1,0,1) may be an identifier for a VOMQ maintained at CM(1) that may store a cell forwarded from IM(1) with a destination of OP(0,1).

Figure 5:
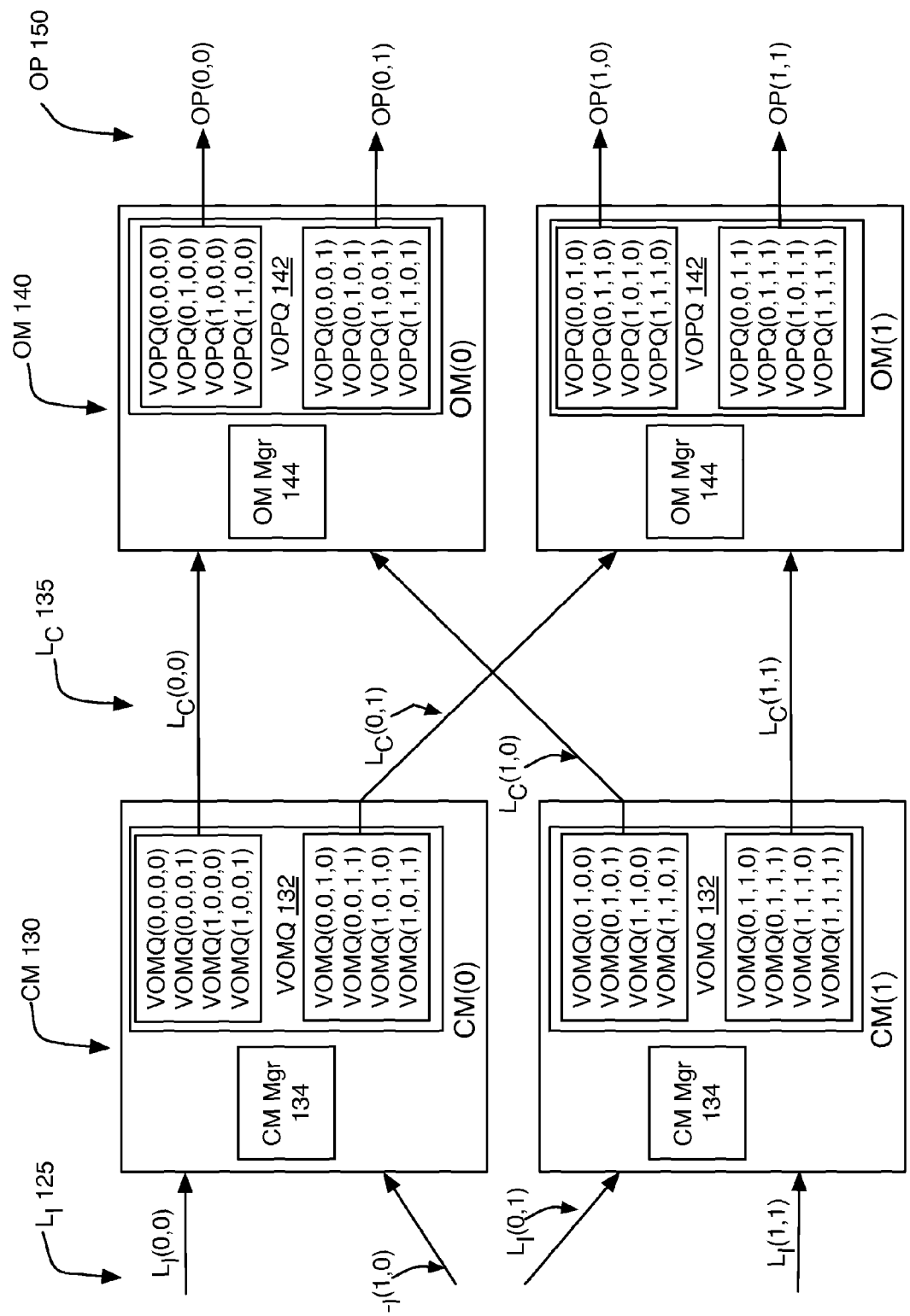
FIG. 5 illustrates a block diagram of an example of two queued central modules coupled to two queued output modules for a three-stage Clos-network packet switch.

FIG. 5 illustrates a block diagram of an example of two queued central modules (e.g., CM 130s) coupled to two queued output modules (e.g., OM 140s) for a three-stage Clos-network packet switch (e.g., the three-stage MMM IQC packet switch 200), arranged in accordance with the present disclosure. As illustrated in FIG. 5, the two CMs include CM(0) and CM(1) and the two OM 140s include OM(0) and OM(1). As shown in FIG. 5, CM(0) may couple to OM(0) via $L_C(0,0)$ and to OM(1) via $L_C(0,1)$. Also, CM(1) may couple to OM(0) via $L_C(1,0)$ and to OM(1) via $L_C(1,1)$. In some examples, cells destined for OP(0,0) or OP(0,1) may be forwarded from CM(0) via $L_C(0,0)$ or from CM(1) via $L_C(1,0)$. Also, cells destined for OP(1,0) or OP(1,1) may be forwarded from CM(0) via $L_C(0,1)$ or from CM(1) via $L_C(1,1)$.

As described for FIG. 4 and shown in both FIG. 4 and FIG. 5, CM(0) and CM(1) may separately include a VOMQ 134 having eight VOMQs. The eight VOMQs separately maintained at CM(0) or CM(1) may be separately associated with one of IM(0) and IM(1) as wells as one of OP(0,0), OP(0,1), OP(1,0) or OP(1,1).

As mentioned above, a VOPQ maintained at an OM 140 may be associated with a CM 130 coupled to the OM 140, may also be associated with an OP 150 coupled to the OM 140, and may further be associated with an IM 120 coupled to the OM 140. As a result of these three associations, FIG. 5 depicts OM(0) and OM(1) each having a total of eight VOPQs. As listed above in TABLE 1, a VOPQ may have an identifier. For example, VOPQ(1,0,0,0) maintained at OM(0) may be an identifier for a VOPQ to store a cell forwarded from IM(1) via CM(0) and then to OM(0) coupled to the cell's destination of OP(0,0). Also VOPQ(0,1,1,1) maintained at OM(1) may be an identifier for a VOPQ to store a cell forwarded from IM(0) via CM(1) and then to OM(1) coupled to the cell's destination of OP(1,1).

Figure 6:
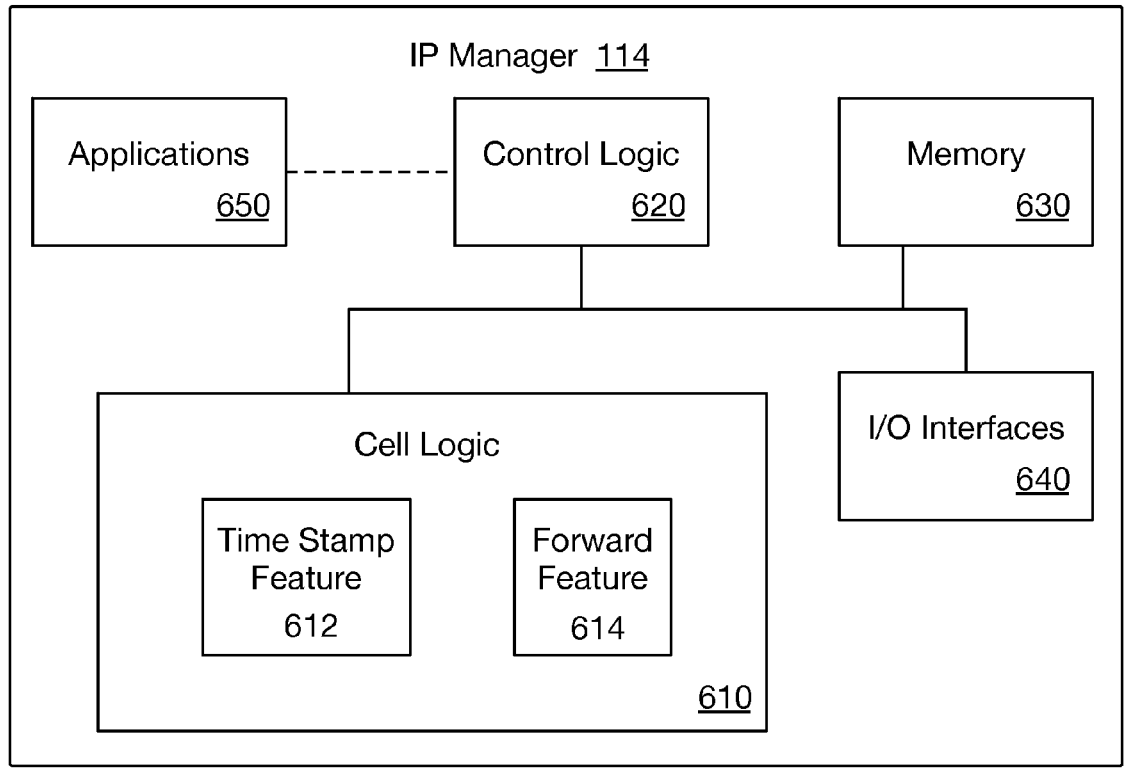
FIG. 6 illustrates a block diagram of an example architecture for an input port manager.

FIG. 6 illustrates a block diagram of an example architecture for input port (IP) manager 114, in accordance with the present disclosure. As described above for switch 100 or switch 200 in FIGS. 1-3, IP 110s separately include an IP manager 114. In some examples, IP manager 114 includes features and/or logic configured or arranged to associate a time stamp value with a cell stored in a VOQ maintained at an IP 110 and forward the cell to an IM 120 coupled to the IP 110.

The example IP manager 114 of FIG. 6, may include cell logic 610, control logic 620, memory 630, input/output (I/O) interfaces 640 and optionally one or more applications 650. As illustrated in FIG. 6, cell logic 610 may be coupled to control logic 620, memory 630 and I/O interfaces 640. Also illustrated in FIG. 6, the optional applications 650 may be arranged in cooperation with control logic 620. Cell logic 610 may further include a time stamp feature 612 and a forward feature 614.

In some examples, the elements portrayed in FIG. 6's block diagram may be configured to support or enable IP manager 114 as described in this disclosure. A given IP manager 114 may include some, all or more elements than those depicted in FIG. 6. For example, cell logic 610 and control logic 620 may separately or collectively represent a wide variety of logic device(s) to implement the features of IP manager 114. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof. This wide variety of logic device(s) may be located entirely at a given IP 110 or at least a portion of the logic device(s) may be located at other locations of switch 200 (e.g., centrally located, located with IP 110, IM 120, CM 130, OM 140 or a combination thereof).

In some examples, as shown in FIG. 6, cell logic 610 may include one or more of a time stamp feature 612 and a forward feature 614. Cell logic 610 may be configured to use these features to perform operations. As described in more detail below, example operations may include one or more of associating a time stamp value with a cell of partitioned data stored at a VOQ maintained at an IP 110 and forwarding the cell to a VCMQ maintained at an IM 120 coupled to the IP 110.

In some examples, control logic 620 may be configured to control the overall operation of IP manager 114. As mentioned above, control logic 620 may represent any of a wide variety of logic device(s) configured to operate in conjunction with executable content to implement the control of IP manager 114. In some alternate examples, the features and functionality of control logic 620 may be implemented within cell logic 610.

According to some examples, memory 630 may be arranged to store executable content. The executable content may be used by control logic 620 and/or cell logic 610 to implement or activate features or elements of IP manager 114. Memory 630 may also be arranged to temporarily maintain VOQ information such as time stamp values associated with cells of partitioned data by features of cell logic 610.

Memory 630 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 640 may provide an interface via an internal communication medium or link between IP manager 114 and elements resident on or located with a given IP 110 (e.g., VOQ 112). I/O interfaces 640 may include interfaces that operate according to various communication protocols to communicate over the internal communication link (e.g., Inter-Integrated Circuit (I²C), System Management Bus (SMBus) or Serial Peripheral Interface Bus (SPI)). I/O interfaces 640 may also provide an interface between IP manager 114 and elements coupled to an IP 110 such as IM 120. As mentioned above for FIG. 1, IP 110s may couple to these elements via links $L_{IP}$ 115. I/O interfaces 640, for example, may include an interface configured to operate according to various communication protocols to allow IP manager 114 to communicate over links $L_{IP}$ 115 (e.g., PCIe, PCI-eXtended (PCI-X), Ethernet, Infiniband, StarFabric, RapidIO, etc.).

In some examples, IP manager 114 may include one or more applications 650 to provide instructions to control logic 620 and/or cell logic 610.

Figure 7:
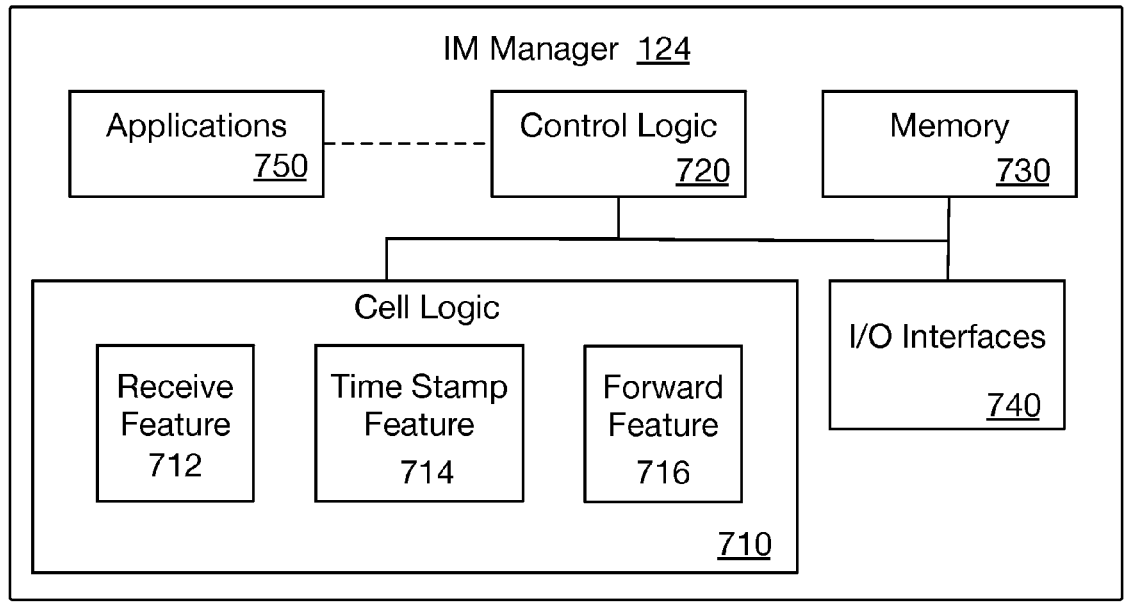
FIG. 7 illustrates a block diagram of an example architecture for an input module manager.

FIG. 7 illustrates a block diagram of an example architecture for an input module (IM) manager 124, arranged in accordance with the present disclosure. As described above for switch 100 or switch 200 in FIGS. 1-4, IM 120s separately include an IM manager 124. In some examples, IM manager 124 includes features and/or logic configured to receive a cell into a VCMQ maintained at an IM 120 and to forward the cell to a CM 130.

The example IM manager 124 of FIG. 7 may include cell logic 710, control logic 720, memory 730, input/output (I/O) interfaces 740 and optionally one or more applications 750. As illustrated in FIG. 7, cell logic 710 may be coupled to control logic 720, memory 730 and I/O interfaces 740. Also illustrated in FIG. 7, the optional applications 750 may be arranged in cooperation with control logic 720. Cell logic 710 may further include one or more of a receive feature 712, a time stamp feature 714 and/or a forward feature 716.

In some examples, the elements portrayed in FIG. 7's block diagram are those elements to support or enable IM manager 124 as described in this disclosure. A given IM manager 124 may include some, all or more elements than those depicted in FIG. 7. For example, cell logic 710 and control logic 720 may separately or collectively represent a wide variety of logic device(s) to implement the features of IM manager 124. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) could be located entirely at a given IM 120 or at least a portion of the logic device(s) could be located at other locations of switch 200 (e.g., centrally located, located with IP 110, CM 130, OM 140 or a combination thereof).

In some examples, as shown in FIG. 7, cell logic 710 may include receive feature 712, time stamp feature 714 and/or forward feature 716. Cell logic 710 may be configured to use one or more of these features to perform several operations. As described in more detail below, example operations may include one or more of receiving a cell into a VCMQ maintained at an IM 120, selecting a VCMQ for forwarding a cell stored in the VCMQ (e.g., based on a time stamp value) and forwarding the cell from the selected VCMQ to a VOMQ maintained at a CM 130 coupled to the IM 120.

In some examples, control logic 720 may be configured to control the overall operation of IM manager 124. As mentioned above, control logic 720 may represent any of a wide variety of logic device(s) that may be configured to operate in conjunction with executable content to implement the control of IM manager 124. In some examples, the features and functionality of control logic 720 may be implemented within cell logic 710.

Similar to memory 630 as described above, memory 730 may include a wide variety of memory media. According to some examples, memory 730 may be arranged to store executable content. The executable content may be used by control logic 720 and/or cell logic 710 to implement or activate one or more features or elements of IM manager 124. Memory 730 may also be arranged to temporarily maintain VCMQ information such as time stamp values associated with cells stored at VCMQs maintained at an IM 120.

Similar to I/O interface 640 as described above, I/O interfaces 740 may provide an interface via an internal communication medium or link between IM manager 124 and elements resident on or located with a given IM 120 (e.g., VCMQ 122). I/O interfaces 740 may also provide an interface between IM manager 124 and elements coupled to an IM 120 such as IP 110 and CM 130.

In some examples, IM manager 124 may include one or more applications 750 to provide instructions to control logic 720 and/or cell logic 710.

Figure 8:
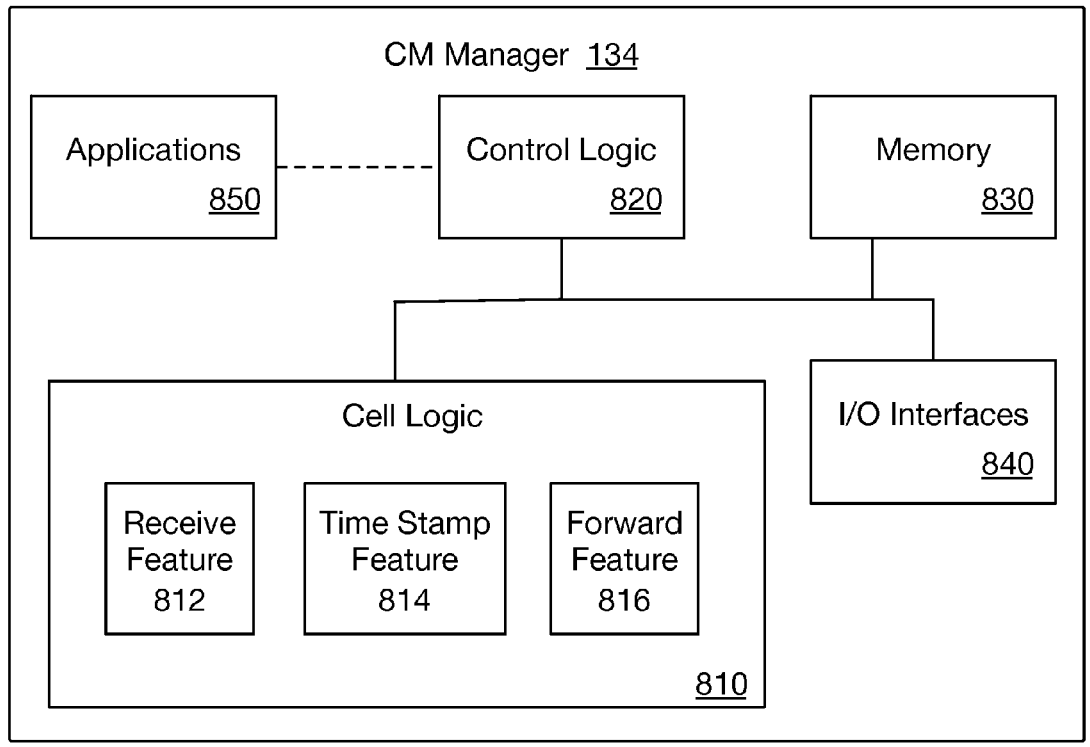
FIG. 8 illustrates a block diagram of an example architecture for a central module manager.

FIG. 8 illustrates a block diagram of an example architecture for a central module (CM) manager 134 arranged in accordance with the present disclosure. As described above for switch 100 or switch 200 in FIGS. 1, 2, 4 and 5, CM 130s may separately include a CM manager 134. In some examples, CM manager 134 may include one or more features and/or logic configured to receive a cell into a VOMQ maintained at a CM 130 and to forward the cell to an OM 140.

The example CM manager 134 of FIG. 8 may include cell logic 810, control logic 820, memory 830, input/output (I/O) interfaces 840 and optionally one or more applications 850. As illustrated in FIG. 8, VOMQ logic 810 may be coupled to control logic 820, memory 830 and I/O interfaces 840. Also illustrated in FIG. 8, the optional applications 850 may be arranged in cooperation with control logic 820. Cell logic 810 may further include a receive feature 812, a time stamp feature 814 and a forward feature 816.

In some examples, the elements portrayed in FIG. 8's block diagram may be configured to support or enable CM manager 134 as described in this disclosure. A given CM manager 134 may include some, all or more elements than those depicted in FIG. 8. For example, cell logic 810 and control logic 820 may separately or collectively represent a wide variety of logic device(s) to implement the features of CM manager 134. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) may be located entirely at a given CM 130 or at least a portion of the logic device(s) may be located at other locations of switch 200 (e.g., centrally located, located with IP 110, IM 120, OM 140 or a combination thereof).

In some examples, as shown in FIG. 8, cell logic 810 may include receive feature 812, time stamp feature 814 and forward feature 816. Cell logic 810 may be configured to use these features to perform several operations. As described in more detail below, example operations may include one or more of receiving a cell into a VOMQ maintained at a CM 130, selecting the VOMQ for forwarding the cells stored in the VCMQ (e.g., based on a time stamp value and/or a matched link to an OM 140) and/or forwarding the one or more cells from the selected VOMQ to a VOPQ maintained at an OM 140 coupled to the CM 130.

In some examples, control logic 820 may be configured to control the overall operation of CM manager 134 and as mentioned above, may represent any of a wide variety of logic device(s) configured to operate in conjunction with executable content to implement the control of CM manager 134. In some alternate examples, the features and functionality of control logic 820 may be implemented within cell logic 810.

Similar to memory 630 as described above, memory 830 may include a wide variety of memory media. According to some examples, memory 830 is arranged to store executable content. The executable content may be used by control logic 820 and/or cell logic 810 to implement or activate features or elements of CM manager 134. Memory 830 may also be arranged to temporarily maintain VOMQ information and selection information obtained by features of cell logic 810.

Similar to I/O interface 640 as described above, I/O interfaces 840 may provide an interface via an internal communication medium or link between CM manager 134 and elements resident on or located with a given CM 130 (e.g., VOMQ 132). I/O interfaces 840 may also provide an interface between CM manager 134 and elements coupled to a CM 130 such as IM 120 and OM 140.

In some examples, CM manager 134 may include one or more applications 850 to provide instructions to control logic 820 and/or cell logic 810.

Figure 9:
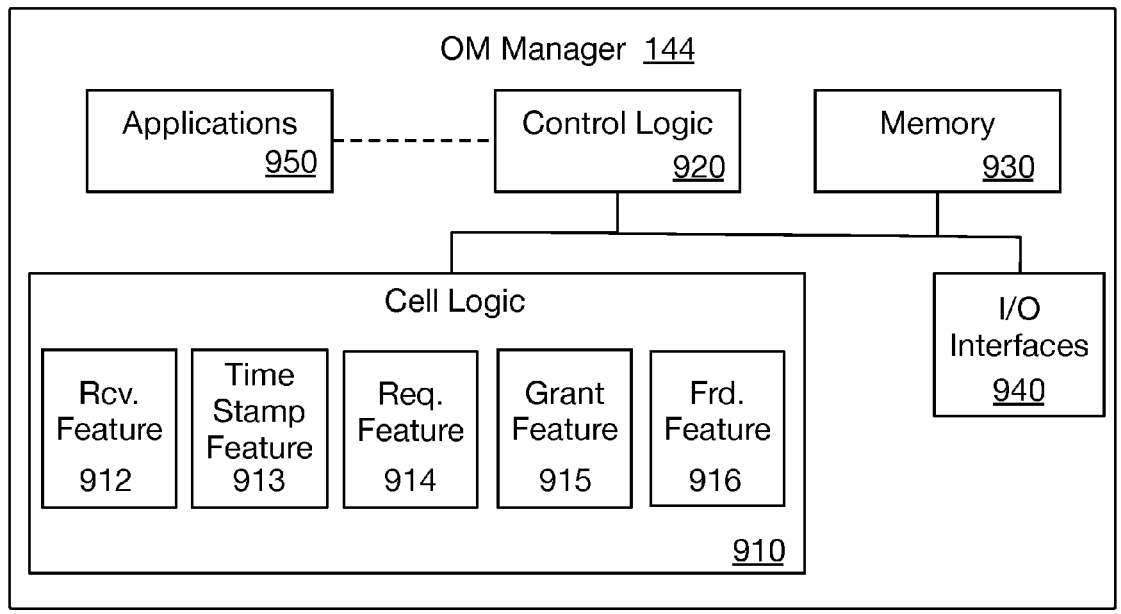
FIG. 9 illustrates a block diagram of an example architecture for an output module manager.

FIG. 9 illustrates a block diagram of an example architecture for an output module (OM) manager 144 arranged in accordance with the present disclosure. As described above for switch 100 or switch 200 in FIGS. 1, 2 and 5, may separately include an OM manager 144. In some examples, OM manager 144 may include one or more features and/or logic configured to match links between an OM 140 and a CM 150, receive a cell into a VOPQ maintained at an OM 140 and/or to forward the cell to an OP 150.

The example OM manager 144 of FIG. 9 may include cell logic 910, control logic 920, memory 930, input/output (I/O) interfaces 940 and optionally one or more applications 950. As illustrated in FIG. 9, cell logic 910 may be coupled to control logic 920, memory 930 and I/O interfaces 940. Also illustrated in FIG. 9, the optional applications 950 may be arranged in cooperation with control logic 920. Cell logic 910 may further include one or more of a receive feature 912, a time stamp feature 913, a request feature 914, a grant feature 915 and/or a forward feature 916.

In some examples, the elements portrayed in FIG. 9's block diagram may be configured to support or enable OM manager 144 as described in this disclosure. A given OM manager 144 may include some, all or more elements than those depicted in FIG. 9. For example, cell logic 910 and control logic 920 may separately or collectively represent a wide variety of logic device(s) to implement the features of OM manager 144. As mentioned previously, an example logic device may include one or more of a computer, a microprocessor, a microcontroller, an FPGA, an ASIC, a sequestered thread or a core of a multi-core/multi-threaded microprocessor or a combination thereof. This wide variety of logic device(s) may be located entirely at a given OM 140 or at least a portion of the logic device(s) may be located at other locations of switch 200 (e.g., centrally located, located with IP 110, IM 120, CM 130 or a combination thereof).

In one example, as shown in FIG. 9, cell logic 910 may include one or more of a receive feature 912, a time stamp feature 913, a request feature 914, a grant feature 915 and/or a forward feature 916. Cell logic 910 may use one or more of these features to perform operations. As described in more detail below, example operations may include one or more of receiving one or more cells into a VOMQ maintained at OM 140, implementing a matching process to match link(s) between an OM 140 and CM 130s, and/or forwarding one or more cells to a destination OP 150.

In some examples, control logic 920 may be configured to control the overall operation of OM manager 144. As mentioned above, control logic 920 may represent any of a wide variety of logic device(s) configured to operate in conjunction with executable content to implement the control of OM manager 144. In some alternate examples, the features and functionality of control logic 920 may be implemented within cell logic 910.

Similar to memory 630 as described above, memory 930 may include a wide variety of memory media. According to some examples, memory 930 is arranged to store executable content. The executable content may be used by control logic 920 and/or cell logic 910 to implement or activate features or elements of OM manager 144. Memory 930 may also be arranged to temporarily maintain VOPQ and link information such as time stamp values for cells stored at VOPQ and link status for links between an OM 140 and CM 130s.

Similar to I/O interface 640 as described above, I/O interfaces 940 may provide an interface via an internal communication medium or link between OM manager 144 and elements resident on or located with a given OM 140 (e.g., VOPQ 142). I/O interfaces 940 may also provide an interface between OM manager 144 and elements coupled to an OM 140 such as CM 130.

In some examples, OM manager 144 may include one or more applications 950 to provide instructions to control logic 920 and/or cell logic 910.

Figure 10:
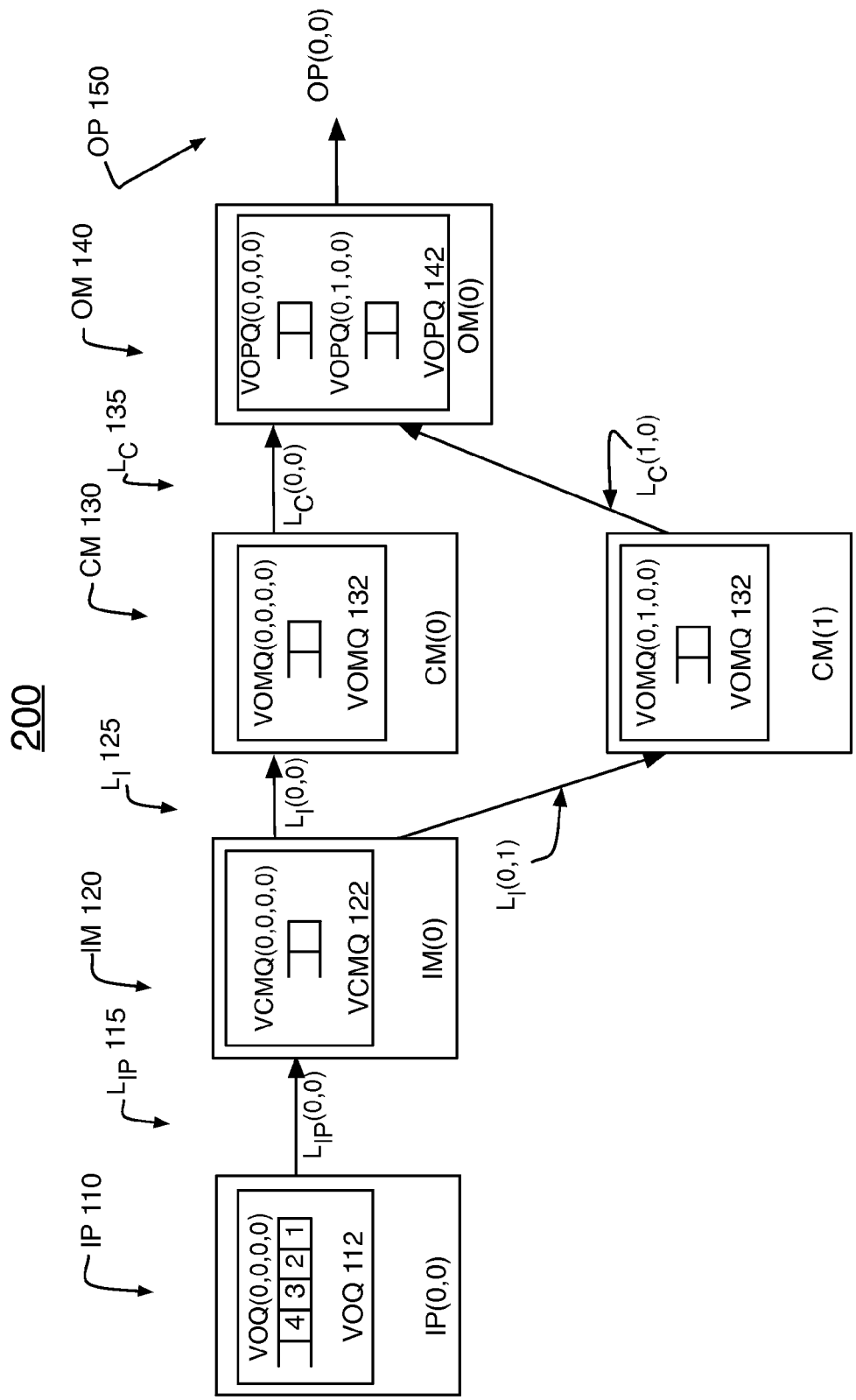
FIG. 10 illustrates an example of partitioned data stored in a virtual output queue maintained at an input port for a three-stage Clos-network packet switch.

FIG. 10 illustrates an example of partitioned data stored in a virtual output queue (e.g., VOQ(0,0,0,0)) maintained at an input port (e.g., IP(0,0)) for a three-stage Clos-network packet switch (e.g., the three-stage MMM IQC packet switch 200), in accordance with the present disclosure. As shown in FIG. 10, IP(0,0) may include VOQ 112 having VOQ(0,0,0,0). FIG. 10 also shows portions of switch 200 via which cells of partitioned data stored in VOQ(0,0,0,0) at IP(0,0) may be forwarded to a destination OP 150 of OP(0,0). In some examples, the portions of switch 200 may include IM(0), CM(0), CM(1) and/or OM(0).

FIG. 10 also shows queues or buffers maintained at IM(0), CM(0), CM(1) and OM(0) that may temporarily store a cell as the cell is forwarded from VOQ(0,0,0,0) towards its destination OP 150 of OP(0,0). As shown above in TABLE 1 and described in more detail for FIGS. 3-5 the queues may have separate identifiers that associate the queues with modules or other queues via which a cell is received and/or associates the queues with a destination of the cell. As depicted in FIG. 10, in some examples, the VCMQ maintained at IM(0) that may receive a cell forwarded from VOQ(0,0,0,0) is VCMQ(0,0,0,0). Also, as depicted in FIG. 10, two alternative routes or paths may exist to forward a cell from VCMQ(0,0,0,0). The first alternative is to VOMQ(0,0,0,0) may be maintained at CM(0) and the second alternative is to a VOMQ(0,1,0,0) may be maintained at CM(1). FIG. 10 further depicts two VOPQs maintained at OM(0), one of the two VOPQs is VOPQ(0,0,0,0), which may receive a cell forwarded from VOMQ(0,0,0,0) at CM(0) that is destined for OP(0,0). Another of the two VOPQs at OM(0) is VOPQ(0,1,0,0), which may receive a cell forwarded from VOMQ(0,1,0,0) at CM(1) that is also destined for OP(0,0).

In some examples, data received at an IP(0,0) of switch 200 may be partitioned into cells and stored in a VOQ maintained at IP(0,0). As mentioned above, VOQs maintained at an IP 110 may be associated with a destination OP 150. So as depicted in FIG. 10, the partitioned cells with a destination of OP(0,0) are stored in VOQ(0,0,0,0). Also, in some examples, a time stamp value may be separately associated with the cells of partitioned data. IP manager 114 at IP(0,0) may include logic and/or features (e.g., time stamp feature 612) configured to associate time stamp values with the cells of partitioned data.

In some examples, as depicted in FIG. 10, the associated time stamp values may indicate the age of a cell of partitioned data such that a cell with a lower time stamp value is older when compared to a cell with a higher stamp value. Also, in some examples, IP manager 114 at IP(0,0) may include logic and/or features configured to store the first cell of a sequence of cells in VOQ(0,0,0,0) such that the oldest cell of the sequence of the cells is at the head of the line (HOL) of VOQ(0,0,0,0). In other words, the HOL cell may also be the oldest cell stored in VOQ(0,0,0,0). FIG. 10 depicts cells with example time stamp values of 1, 2, 3, and 4, with a time stamp value of 1 indicating the cell with the oldest age. This disclosure is not limited to a time stamp value of a single-digit number but may include any number of ways to indicate an age of a cell of partitioned data as compared to an age of other cells of partitioned data. Also, this disclosure is not limited to a VOQ having a storage capacity of four cells of partitioned data as shown in FIG. 10. A VOQ may have a capacity to store any number of cells of partitioned data.

In some examples, the IP manager 114 at IP(0,0) and other IP manager 114s located at other IP 110s of switch 200 may be configured to obtain or generate time stamp values based on a common reference clock or other type of common timing mechanism (not shown). The common reference clock may enable separate IP manager 114s to associate time stamp values with partitioned cells as the cells are stored at various VOQs maintained at various IP 110s of switch 200. The associated time stamp values may indicate ages of cells from among various cells of partitioned data. A cell may be forwarded and/or links between modules may be matched based on an indicated age of a cell as compared to other cells forwarded from the same VOQ or from other VOQs. The other VOQs may be maintained at the same IP 110 or a different IP 110.

Figure 11:
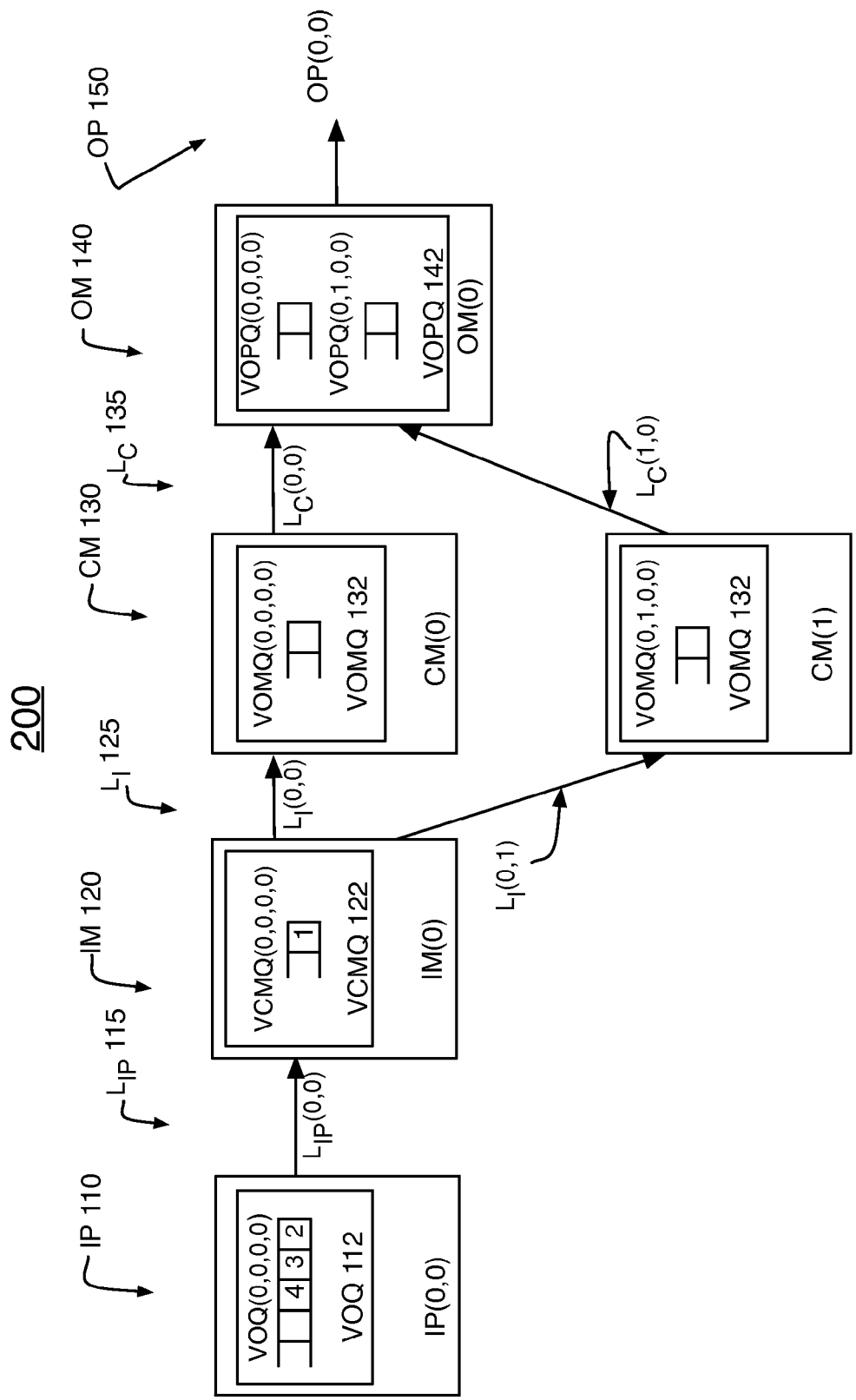
FIG. 11 illustrates an example of a first cell of the partitioned data forwarded to a queue maintained at an input module coupled to the input port for the three-stage Clos-network packet switch.

FIG. 11 illustrates an example of a first cell of the partitioned data forwarded to a queue (e.g., VCMQ(0,0,0,0)) maintained at an input module (e.g., IM(0)) coupled to the input port (e.g., IP(0,0)) for the three-stage Clos-network packet switch (e.g., the three-stage MMM IQC packet switch 200), in accordance with the present disclosure. In some examples, IP manager 114 at IP(0,0) may include logic and/or features (e.g., forward feature 614) to forward a first cell of the cells of partitioned data stored in VOQ(0,0,0,0) to VCMQ (0,0,0,0) maintained at IM(0). As mentioned above for FIG. 10, the HOL cell stored in VOQ(0,0,0,0) may also be the oldest cell and has a time stamp value of 1. Thus, as shown in FIG. 11, the first cell to be forwarded to VCMQ(0,0,0,0) may have an associated time stamp value of 1.

In some examples, the first cell may be forwarded from VOQ(0,0,0,0) based on initiation of a first transfer interval. A transfer interval may include a period of time allocated to forward a cell of partitioned data through at least a portion of switch 200. The period of time, for example, may include an amount of time needed to determine which cell to forward and may also include an amount of time to match one or more links between various modules of switch 200 (e.g., links between CM 130s and OM 140s). The period of time may consider a worst-case scenario. The worst-case scenario, for example, may account for longest possible times to transfer a cell between portions of switch 200 due to the length of a path or route the cell may follow or to other factors (e.g., switch congestion).

In some examples, IM manager 124 at IM(0) may include logic and/or features (e.g., receive feature 712) configured to receive the first cell into VCMQ(0,0,0,0). IM manager 124 at IM(0) may also have logic and/or features (e.g., time stamp feature 714) configured to obtain a time stamp value associated with the received first cell. The time stamp value may be at least temporarily stored in a memory maintained at IM(0) or accessible to IM manager 124 (e.g., memory 730). As described more below, the time stamp value associated with the first cell may be used to further forward the first cell towards its destination of OP(0,0) and yet maintain its sequence as the first cell is forwarded to its destination of OP(0,0).

Figure 12:
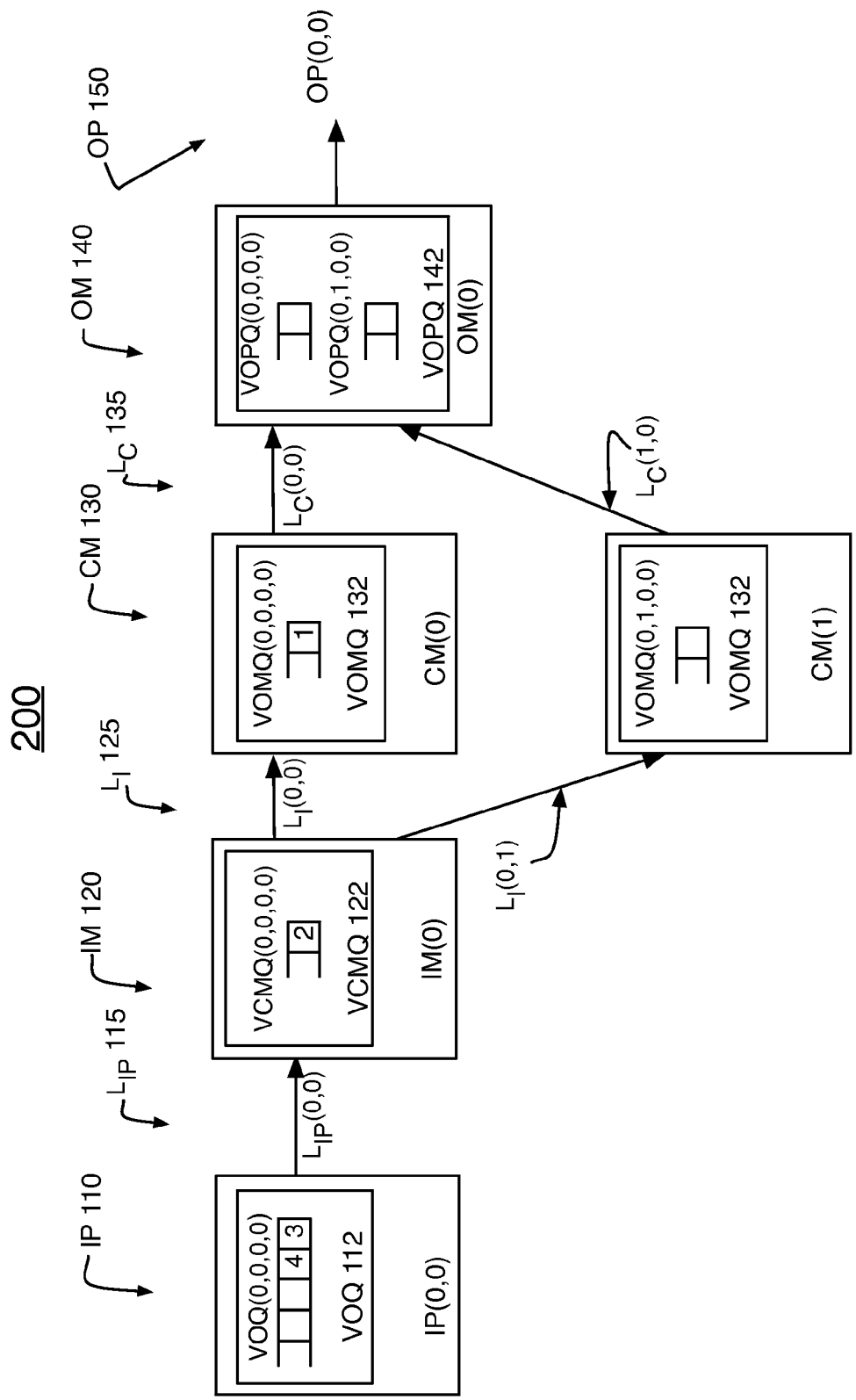
FIG. 12 illustrates an example of the first cell forwarded to a first central module coupled to the input module and a second cell of the partitioned data forwarded to the input module for the three-stage Clos-network packet switch.

FIG. 12 illustrates an example of the first cell forwarded to a first central module coupled to the input module (e.g., CM(0)) and a second cell of the partitioned data forwarded to the input module (e.g., IM(0)) for the three-stage Clos-network packet switch (e.g., the three-stage MMM IQC packet switch 200), in accordance with the present disclosure. As shown in FIG. 12, in some examples, the first cell is forwarded to VOMQ(0,0,0,0) maintained at CM(0). In some examples, IM manager 124 at IM(0) may include logic and/or features (e.g., forward feature 716) configured to forward the first cell from VCMQ(0,0,0,0) to VOMQ(0,0,0,0) based on initiation of a second transfer interval and based on the first cell's associated time stamp value. Also, as shown in FIG. 12, a second cell from among the cells of partitioned data may then be forwarded to VCMQ(0,0,0,0) based on initiation of the second transfer interval.

In some examples, the second transfer interval may be a consecutive transfer interval to the first transfer interval mentioned above for FIG. 12. However, in other examples the second transfer interval may have any number of other transfer intervals that may have occurred between the first transfer interval and the second transfer interval. Further, the description of first, second, third, fourth, etc. transfer intervals may indicate subsequent transfer intervals but are not limited to subsequent transfer intervals that are also consecutive transfer intervals.

In some examples, although not shown in FIG. 12, other cells from partitioned data received from VOQs other than VOQ(0,0,0,0) may be stored in other VCMQs maintained at IM(0). For these examples, IM manager 124 at IM(0) may determine that the time stamp value of 1 associated with the first cell indicates an age that is older than the other cells. IM manager 124 at IM(0) may then forward the first cell to VOMQ(0,0,0,0) at CM(0) in response to initiation of a second transfer interval and also based on the first cell's associated time stamp value of 1. Although FIG. 12 depicts the first cell being forwarded to a VOMQ at CM(0), in other examples, forwarding the first cell to a VOMQ CM(1) may be an alternative route or path for the first cell to follow as the first cell is forwarded towards its destination of OP(0,0).

In some examples, CM manager 134 at CM(0) may include logic and/or features (e.g., receive feature 812) configured to receive the first cell into VOMQ(0,0,0,0). CM manager 124 at CM(0) may also have logic and/or features (e.g., time stamp feature 814) configured to obtain a time stamp value associated with the received first cell. The time stamp value may be at least temporarily stored in a memory maintained at CM(O) or accessible to CM manager 134 (e.g., memory 830).

Figure 13:
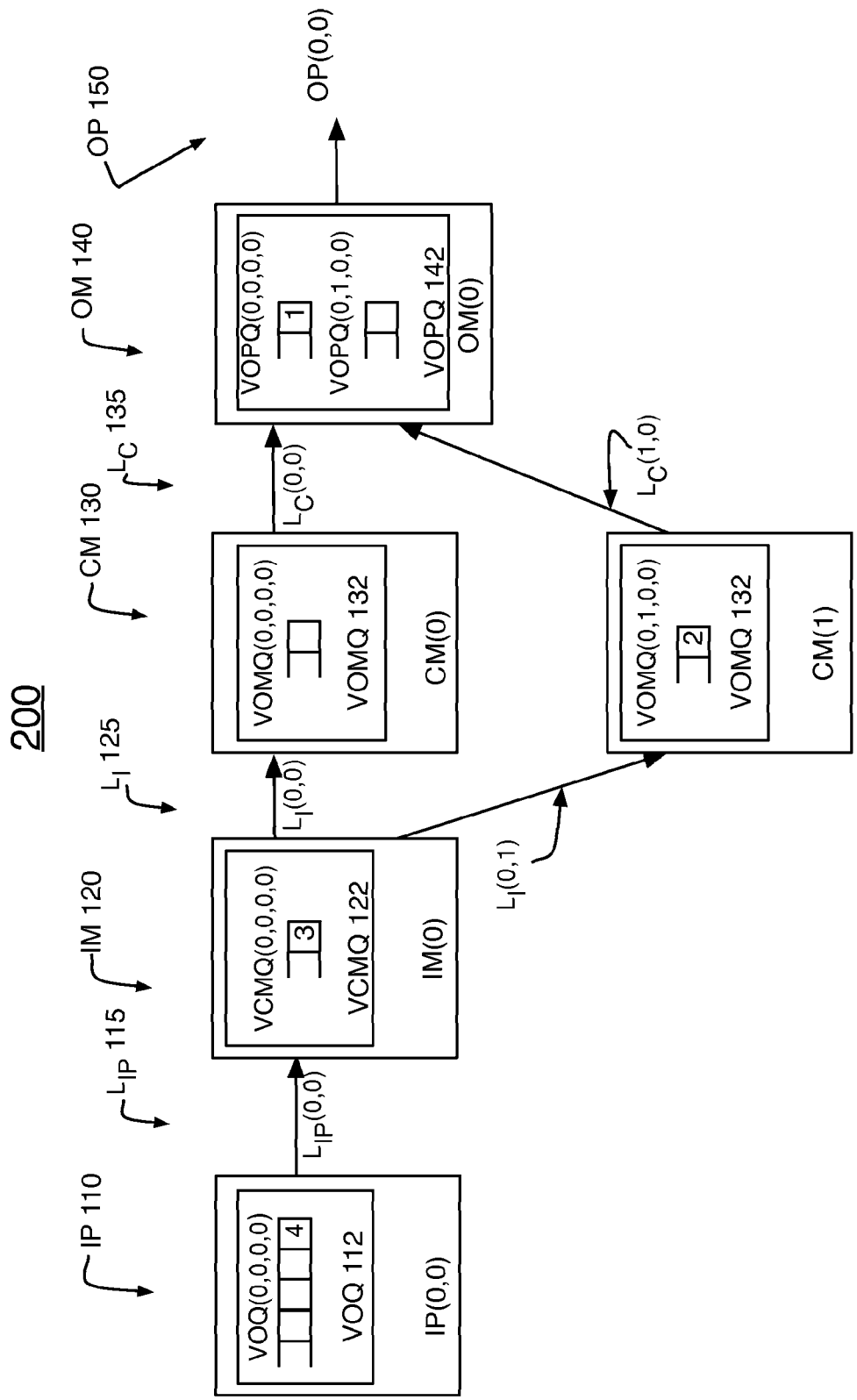
FIG. 13 illustrates an example of the first cell forwarded to an output module coupled to the first central module, the second cell forwarded to a second central module coupled to the input module and a third cell of the partitioned data forwarded to the input module for the three-stage Clos-network packet switch.

FIG. 13 illustrates an example of the first cell forwarded to an output module (e.g., OM(0)) coupled to the first central module (e.g., CM(0)), the second cell forwarded to a second central module (e.g., CM(1)) coupled to the input module (e.g., IM(0)) and a third cell of the partitioned data forwarded to the input module for the three-stage Clos-network packet switch (e.g., the three-stage MMM IQC packet switch 200), in accordance with the present disclosure. As shown in FIG. 13, in some examples, the first cell may be forwarded to VOPQ(0,0,0,0) maintained at OM(0). In some examples, CM manager 134 at CM(0) may include logic and/or features (e.g., forward feature 816) configured to forward the first cell from VOMQ(0,0,0,0) to VOPQ(0,0,0,0) based on initiation of a third transfer interval and based on the first cell's associated time stamp value. Also, as shown in FIG. 13, the second cell and a third cell from among the cells of partitioned data may be forwarded to their respective queues maintained at CM(1) and IM(0).

In some examples, although not shown in FIG. 13, other cells from partitioned data received from VOQs other than VOQ(0,0,0,0) may be stored in other VOMQs maintained at CM(0). For these examples, CM manager 134 at CM(0) may be arranged to determine that the time stamp value of 1 associated with the first cell indicates an age that is older than the other cells. CM manager 134 at CM(0) may then forward the first cell to VOPQ(0,0,0,0) at OM(0) in response to initiation of a third transfer interval and also based on the first cell's associated time stamp value of 1. As described more below, in some examples, forwarding the first cell based on the first cell's associated time stamp value may also include interaction with CM manager 134 at CM(0). For these examples, CM manager 134 may include logic and/or features configured to match link $L_C(0,0)$ between CM(0) and OM(0) via an iterative process to forward the first cell to VOPQ(0,0,0,0) via link $L_C(0,0)$ in response to the third transfer interval.

Figure 14:
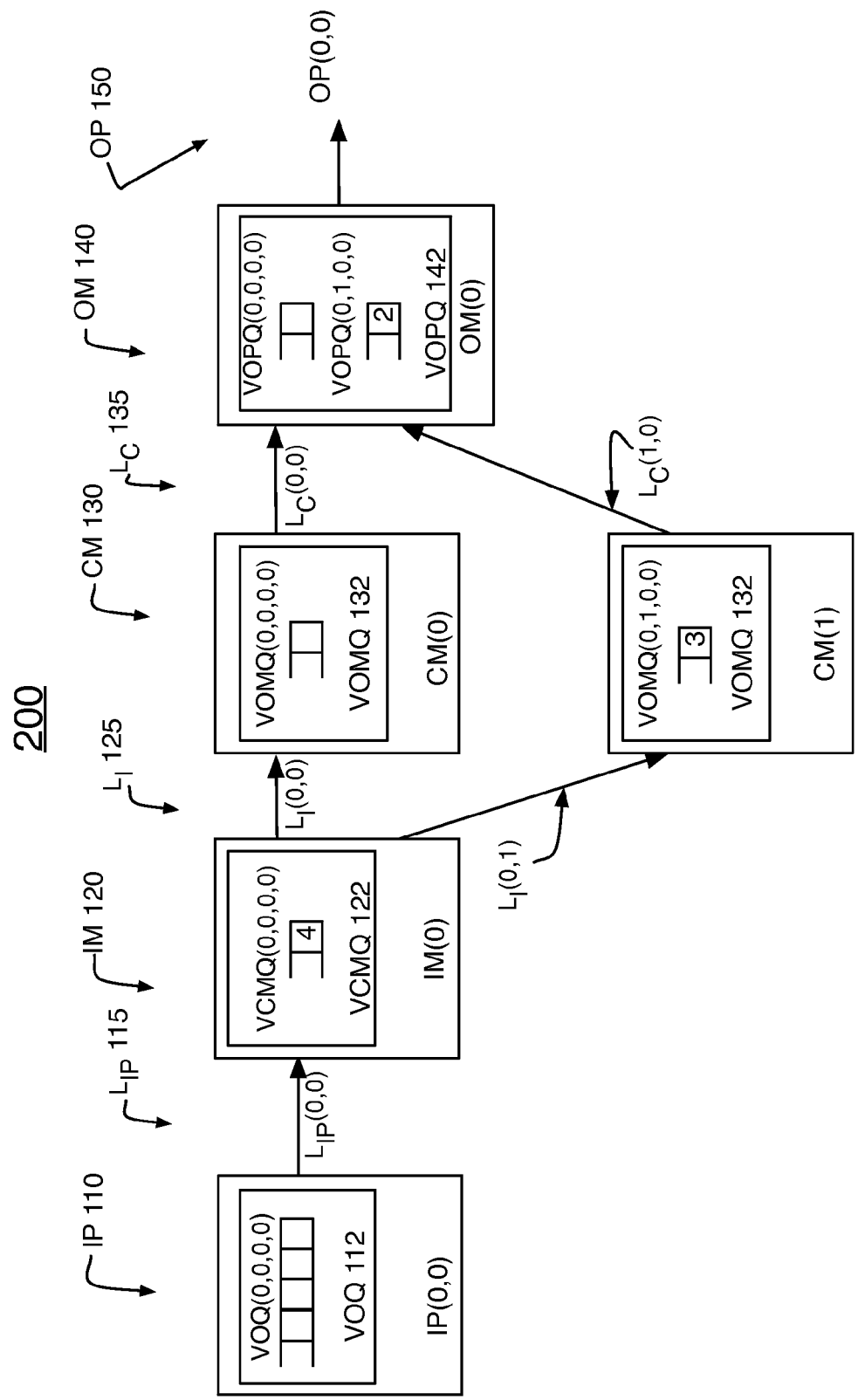
FIG. 14 illustrates an example of the first cell forwarded to an output port coupled to the output module, the second cell forwarded to the output module, the third cell forwarded to the second central module and the fourth cell of the partitioned data forwarded to the input module for the three-stage Clos-network packet switch.

FIG. 14 illustrates an example of the first cell forwarded to an output port (e.g., OP(0,0)) coupled to the output module (e.g., OM(0)), the second cell forwarded to the output module, the third cell forwarded to the second central module (e.g., CM(1)) and the fourth cell of the partitioned data forwarded to the input module (e.g., IM(0)) for the three-stage Clos-network packet switch (e.g., the three-stage MMM IQC packet switch 200), in accordance with the present disclosure. As shown in FIG. 14, in some examples, VOPQ(0,0,0,0) is shown as empty to indicate the first cell has been forwarded to its destination of OP(0,0). In some examples, OM manager 144 at OM(0) may include logic and/or features (e.g., forward feature 916) configured to forward the first cell from VOPQ (0,0,0,0) to OP(0,0) based on initiation of a fourth transfer interval. Also, as shown in FIG. 14, the second cell, the third cell and the fourth cell from among the cells of partitioned data may be forwarded to their respective queues at OM(0), CM(1) and IM(0). The second cell, the third cell and the fourth cell may also be forwarded based on initiation of the fourth transfer interval.

In some examples, although not shown in FIG. 14, other cells from partitioned data received from VOQs other than VOQ(0,0,0,0) may be stored in other VOPQs maintained at OM(0). For these examples, OM manager 144 at OM(0) may determine that the time stamp value of 1 associated with the first cell indicates an age that is older than the other cells. OM manager 144 at OM(0) may then forward the first cell to its destination of OP(0,0) in response to initiation of the fourth transfer interval and also based on the first cell's associated time stamp value of 1. Also, as shown in FIG. 14, the second cell, the third cell and a fourth cell from among the cells of partitioned data may be forwarded to their respective queues maintained at OM(0), CM(1) and IM(0). As a result of the first cell being the first cell forwarded to OP(0,0), the sequence of the cells may be maintained.

In some examples, although not shown in FIG. 14, the first cell and the second cell may be concurrently stored at separate VOPQs maintained at OM(0). This may occur due to the separate routes via which the first cell and the second cell were forwarded through switch 200. As mentioned for the examples above, the first cell may be forwarded via CM(0) and the second cell may be forwarded via CM(1). Delays due to congestion at link $L_C(0,0)$ between CM(0) and OM(0) may lead to the concurrent storage. Also, as described in more detail below, an iterative link matching process for forwarding the first and second cells to the VOPQs maintained at OM(0) link $L_C(0,0)$ may also lead to the concurrent storage.

Even if the first cell and the second cell are concurrently stored at VOPQs maintained at OM(0), OM manager 144 at OM(0) may be arranged to forward the first cell due to the first cell's associated time stamp value of 1 indicating an age that is older than the age of the second cell with an associated time stamp value of 2.

Figure 15:
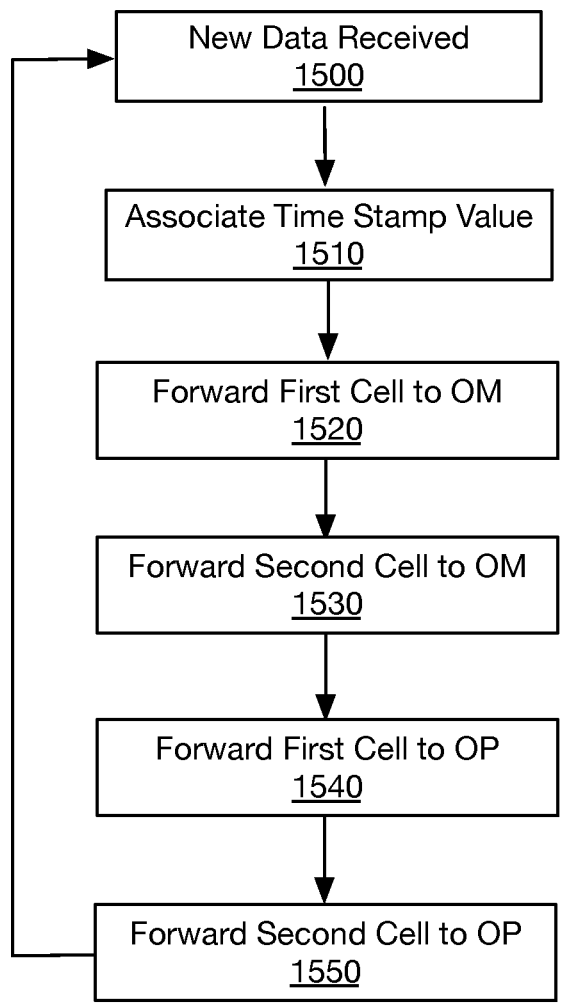
FIG. 15 illustrates a flow chart of example methods for forwarding cells of partitioned data through a three-stage Clos-network packet switch.

FIG. 15 illustrates a flow chart of example methods for forwarding cells of partitioned data through a three-stage Clos-network packet switch (e.g., the three-stage MMM IQC packet switch 200), in accordance with the present disclosure. The same portions of switch 200 as shown in FIGS. 2-5 and 10-14, along with the various managers described in FIGS. 6-9, may be used to illustrate the example methods. But the described methods are not limited to only implementations on switch 200 including the various managers described in FIGS. 6-9. The example methods may be implemented on three-stage MMM IQC packet switches that may include managers having one or more of the elements depicted in FIGS. 6-9. Processing may include one or more functional operations or actions as depicted by blocks 1500, 1510, 1520, 1530, 1540, and/or 1550.

Processing may begin at block 1500 (New Data Received), where data may be received at IP(0,0) and partitioned into cells. As mentioned above for FIGS. 10-14, the data may have a destination of OP(0,0) and the partitioned cells may be stored in VOQ(0,0,0,0).

Processing may continue from block 1500 to block 1510 (Associate Time Stamp Value), the IP manager 114 for IP(0, 0) may associate (e.g., via time stamp feature 612) a separate time stamp value with each cell of the partitioned data stored in VOQ(0,0,0,0). In some examples, time stamp feature 614 may obtain or generate the separate time stamp values from a common reference clock and the time stamp values with the lowest value may indicate the oldest cell. Further, as described for FIGS. 10-14, time stamp values may be associated such that the oldest cell (e.g., time stamp value of 1) is the HOL cell for the cells stored in VOQ(0,0,0,0).

Processing may continue from block 1510 to block 1520 (Forward First Cell to OM), a first cell may be forwarded from VOQ(0,0,0,0) and then through modules of switch 200. In some examples, as described above for FIGS. 10-14, the first cell has the lowest time stamp value and is forwarded via IM(0) coupled to IP(0,0), then via CM(0) coupled to IM(0) and then via OM(0) which is coupled to the destination of OP(0,0). Also as mentioned above, managers at IP(0,0), IM(0), CM(0) and OM(0) may include logic and/or features configured to forward the first cell through separate portions of switch 200 based on initiation of transfer intervals and based on the first cell's associated time stamp value.

Proceeding from block 1520 to block 1530 (Forward Second Cell to OM), a second cell may be forwarded from VOQ(0,0,0,0) and then through modules of switch 200. In some examples, as described above for FIGS. 10-14, the second cell has the second lowest time stamp value and is forwarded via IM(0) coupled to IP(0,0), then via CM(1) coupled to IM(0) and then via OM(0) which is coupled to the destination of OP(0,0). Also as mentioned above, managers at IP(0,0), IM(0), CM(1) and OM(0) may include logic and/or features configured to forward the second cell through separate portions of switch 200 based on initiation of transfer intervals and based on the second cell's associated time stamp value.

Processing may continue from block 1530 to block 1540 (Forward First Cell to OP), where OM manager 144 at OM(0) may forward the first cell to destination OP(0,0). In some examples, as mentioned above for FIGS. 10-14, the first cell may have been stored at VOPQ(0,0,0,0) and OM manager 144 at OM(0) may include logic and/or features (e.g., forward feature 916) configured to forward the first cell from VOPQ (0,0,0,0) to OP(0,0). The forwarding of the first cell may be based on initiation of a transfer interval (e.g., a fourth transfer interval) and based on the first cell's associated time stamp value.

Continuing to from block 1540 to block 1550 (Forward Second Cell to OP), where OM manager 144 at OM(0) may forward the second cell to destination OP(0,0). In some examples, as mentioned above for FIGS. 10-14, the second cell may have been stored at VOPQ(0,1,0,0) and OM manager 144 at OM(0) may include logic and/or features (e.g., forward feature 916) configured to forward the second cell from VOPQ(0,1,0,0) to OP(0,0). The forwarding of the second cell may be based on initiation of a transfer interval (e.g., a fifth transfer interval) and based on the second cell's associated time stamp value. Also, as mentioned above for FIGS. 10-14, the second cell may have been forwarded such that the first cell was forwarded to OP(0,0) prior to the second cell being forwarded to OP(0,0).

In some examples, the process may start over at block 1500 based on receipt of new data at an input port (e.g., IP(0,0)) of switch 200.

Figure 16:
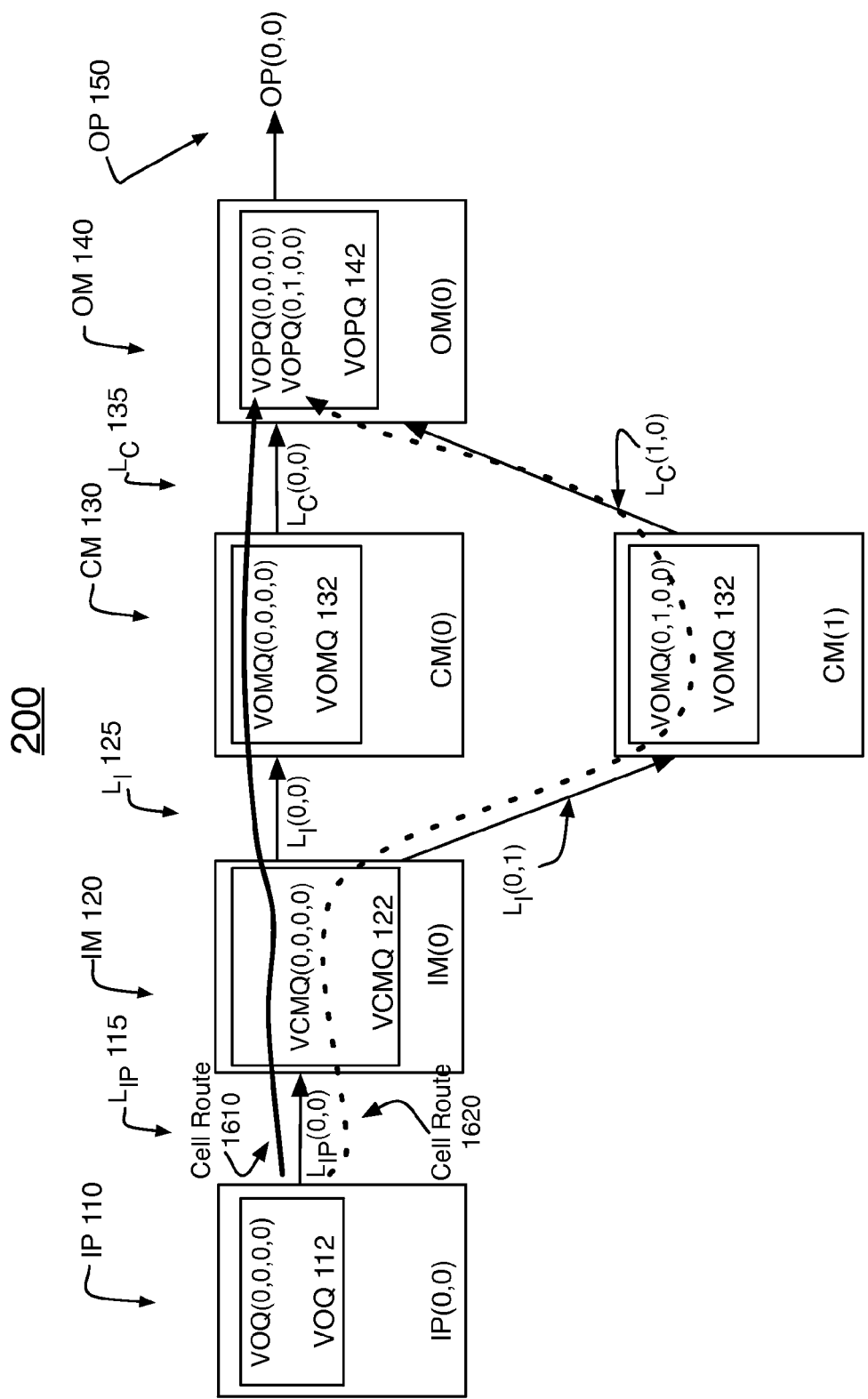
FIG. 16 illustrates example cell routes to forward cells of partitioned data through a three-stage Clos-network packet switch.

FIG. 16 illustrates example cell routes 1610 and 1620 to forward cells of partitioned data through a three-stage Clos-network packet switch (e.g., the three-stage MMM IQC packet switch 200), in accordance with the present disclosure. Cell routes 1610 and 1620 illustrate example cell routes that cells of partitioned data may follow as the cells are forwarded to an example destination of OP(0,0). Cell route 1610 may be depicted in FIG. 16 as a sold-line and cell route 1620 may be depicted as a dotted-line.

In some examples, data may be received by switch 200. The data may be partitioned into a sequence of cells (e.g., a data flow), the cells may be separately associated with a time stamp value and then forwarded through switch 200. Cell routes 1610 and 1620 indicate examples of how first and second cells of the data flow may follow different routes through switch 200. As mentioned previously, managers at an input port and each stage of switch 200 may be configured or arranged to forward the first and second cells through switch 200 such that the cells of the data flow may be forwarded to their destination of OP(0,0) in the sequence in which the cells were partitioned and/or the sequence in which the cells were forwarded from IP(0,0).

According to some examples, one or more cells from a data flow are forwarded between queues separately maintained at elements of switch 200 in response to a transfer interval. For example, as illustrated in FIG. 16, a first cell from a portion of a data flow may be forwarded via cell route 1610. So in response to initiation of a first transfer interval the cell may be forwarded from VOQ(0,0,0,0) maintained at IP(0,0) to VCMQ(0,0,0,0) maintained at IM(0). Then, in response to initiation of a second transfer interval, the first cell may be forwarded to VOMQ(0,0,0,0) maintained at CM(0). Further, in response to initiation of a third transfer interval, the first cell may be forwarded to VOPQ(0,0,0,0). Finally, in response to a fourth transfer interval the cell may be forwarded to the cell's destination of OP(0,0).

As mentioned previously, first, second, third and fourth transfer intervals are described to merely indicate a timing event from the perspective of a given cell. Thus, other cells from the same data flow may be forwarded via different cell routes (e.g., cell route 1620) in response to initiation of at least some of the same first, second, third and fourth intervals. Also, other transfer intervals for cells belonging to other data flows that are being forwarded through switch 200 may occur before, in-between or after the first, second, third and fourth transfer intervals.

Figure 17:
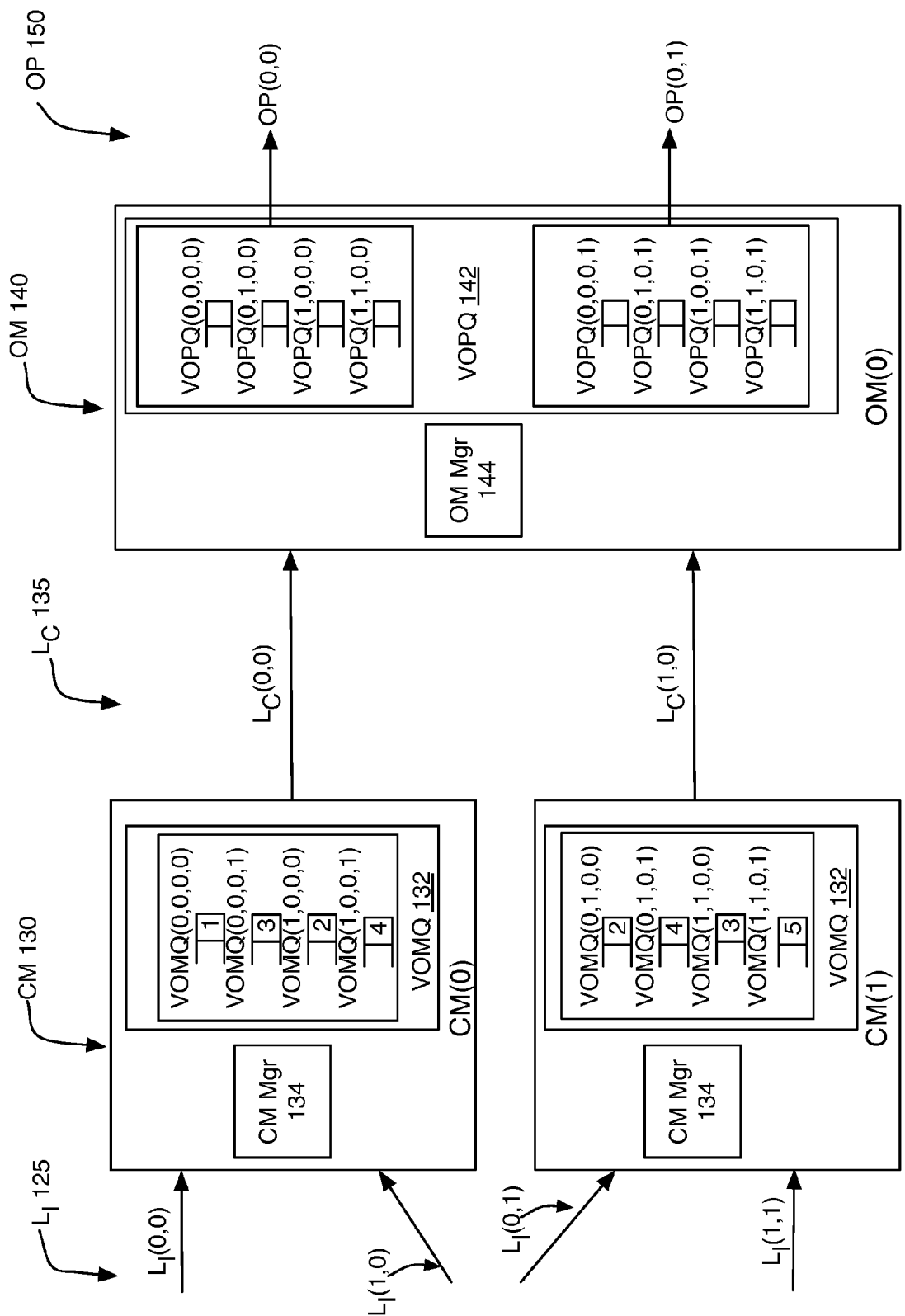
FIG. 17 illustrates an example of a portion of a three-stage Clos-network packet switch with cells stored in queues maintained at two central modules coupled to an output module coupled to destination output ports for the cells.

FIG. 17 illustrates an example of a portion of a three-stage Clos-network packet switch (e.g., the three-stage MMM IQC packet switch 200) with cells stored in queues maintained at two central modules (e.g., CM(0) and CM(1)) coupled to an output module (e.g., OM(0)) coupled to destination output ports (e.g., OP(0,0) and OP(0,1)) for the cells, in accordance with the present disclosure. For simplicity purposes, FIG. 17 depicts the portions of switch 200 that include queues maintained at CM(0), CM(1) and OM(0) that are associated with destination OP $150s$ OP(0,0) and OP(0,1). Also for simplicity purposes, FIG. 17 does not show OM(1) and the links $L_C$ 135 coupled between OM(1) and the two CM $130s$.

In some examples, as illustrated in FIG. 17, VOMQs maintained at CM(0) and CM(1) may include cells having separate time stamp values to indicate an age of the cell stored in a given VOMQ. For example, VOMQs at CM(0) are shown in FIG. 17 as including a cell having an associated time stamp value of 1 in VOMQ(0,0,0,0), 3 in VOMQ(0,0,0,1), 2 in VOMQ(1,0,0,0) and 4 in VOMQ(1,0,0,1). Also for example, VOMQs at CM(1) are shown in FIG. 17 as including a cell having an associated time stamp value of 2 in VOMQ(0,1,0,0), 4 in VOMQ(0,1,0,1), 3 in VOMQ(1,1,0,0) and 5 in VOMQ(1,1,0,1).

As described above, in some examples, cells of partitioned data belonging to the same data flow may follow different routes through switch 200 to reach an OM 140 coupled to a destination OP 150 for the cells. For example, the cell stored in VOMQ(0,0,0,0) at CM(0) and the cell stored in VOMQ(0,1,0,0) at CM(1) may belong to a data flow. Also, for example, the cell stored in VOMQ(1,0,0,0) at CM(0) and the cell stored in VOMQ(1,1,0,0) may belong to another data flow.

As shown in FIG. 17, CM(0) and CM(1) may be coupled to OM(0) via links $L_C(0,0)$ and $L_C(1,0)$, respectively. In some examples, CM manager 134 at CM(0) and CM manager 134 at CM(1) may include logic and/or features to relay or provide a time stamp value associated with a cell stored in a VOMQ that may be forwarded via either link $L_C(0,0)$ or link $L_C(1,0)$. A time stamp value, for example, may be relayed to OM manager 144 for OM(0). As described in more detail below, OM manager 144 may include logic and/or features to receive or obtain the time stamp values for the cells stored in the VOMQs and use the time stamp values to match links $L_C(0,0)$ and $L_C(1,0)$. For example, a cell stored in VOQ(0,0,0,0) at CM(0) may be forwarded via a matched link of $L_C(0,0)$ to VOPQ(0,0,0,0) that is associated with the cell's destination OP(0,0) maintained at OM(0).

Figure 18:
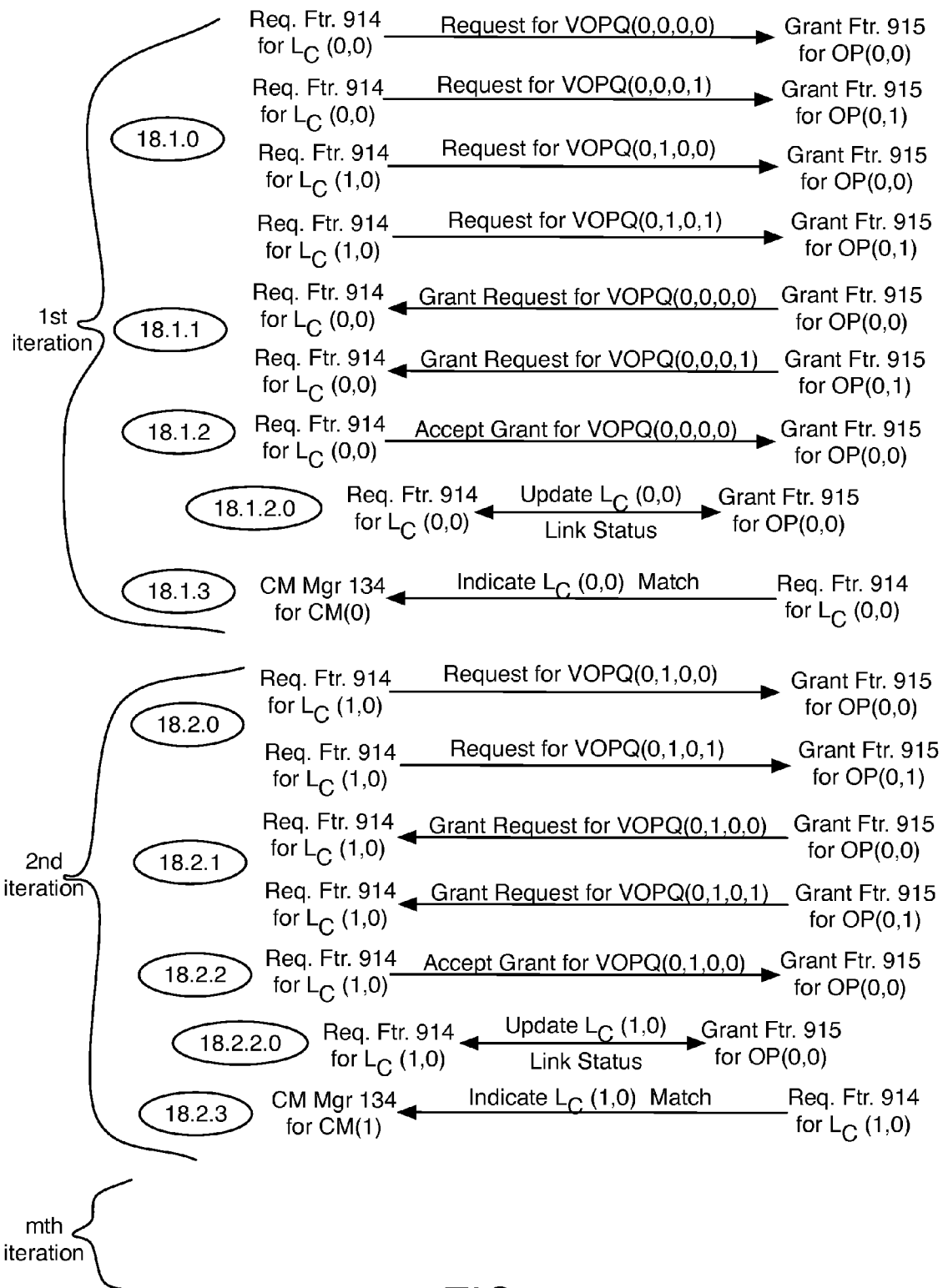
FIG. 18 illustrates an example process diagram for matching links between an output module and two central modules for a three-stage Clos-network packet switch.

FIG. 18 illustrates an example process diagram for matching links between an output module (e.g., OM(0)) and two central modules (e.g., CM(0) and CM(1)) for a three-stage Clos-network packet switch (e.g., the three-stage MMM IQC packet switch 200), in accordance with the present disclosure. In some examples, the process diagram is implemented using the example portions of switch 200 depicted in FIG. 17. Although the process shown in FIG. 18 refers to matching $L_C$ 135 links coupled to OM(0), other $L_C$ 135 links to OM(1) may go through a similar matching process. For simplicity purposes, the illustrated matching process is described from the perspective of OM(0) having links $L_C(0,0)$ and $L_C(1,0)$. Also for simplicity purposes, the illustrated matching process describes matching to forward a cell to a VOPQ associated with OP(0,0) and OP(0,1). In some examples, cells may forwarded to other VOPQs associated with other OP $150s$ and may also go through a similar matching process.

As shown in FIG. 18, the process may be an iterative process that includes a first iteration, a second iteration and an mth iteration, where m may equate to the number of CM 130s coupled to an OM 140 via links $L_C$ 135. As mentioned above, m=2 for switch 200, so first and second iterations apply to switch 200. However, in other example switches with m>2, additional iterations may occur until links $L_C$ 135 are matched or until other constraints (e.g., time limits) end the matching process.

In some examples, OM manager 144 for OM(0) may include logic and/or features to obtain time stamp values (e.g., time stamp feature 913) associated with one or more cells stored in VOMQs maintained at CM(0) and CM(1). Time stamp feature 913 of OM manager 144 for OM(0) may temporarily store the obtained time stamp values in a memory maintained at or accessible to OM manager 144 (e.g., memory 930). Thus, as described above for FIG. 17, the time stamp values of 1 for VOMQ(0,0,0,0), 3 for VOMQ(0,0,0,1), 2 for VOMQ(1,0,0,0), 4 for VOMQ(1,0,0,1), 2 for VOMQ(0,1,0,0), 4 for VOMQ(0,1,0,1), 3 for VOMQ(1,1,0,0) and 5 for VOMQ(1,1,0,1) are obtained.

Starting at example process 18.1.0 (Request for VOPQ(0,0,0,0); Request for VOPQ(0,0,0,1); Request for VOPQ(0,1,0,0); Request for VOPQ(0,1,0,1)), OM manager 144 for OM(0) may include logic and/or features to determine which cell(s) stored at VOMQs at CM(0) and/or CM(1) has the lowest time stamp value. In some examples, the logic and/or features may include a request feature 914 for $L_C$(0,0) and a request feature 914 for $L_C$(1,0).

In some examples, request feature 914 for $L_C$(0,0) may place separate requests to match a link to forward a cell from a VOMQ at CM(0) based on the cell's associated time stamp value (ties broken arbitrarily). The separate requests may include a request to match $L_C$(0,0) to forward a cell destined for OP(0,0) and a request to match $L_C$(0,0) to forward a cell destined for OP(0,1). Since VOMQ(0,0,0,0) has a cell with the lowest associated time stamp value for cells having a destination of OP(0,0), request feature 914 for $L_C$(0,0) may place a request for VOPQ(0,0,0,0) as shown in FIG. 18. Also since VOMQ(0,0,0,1) has a cell with the lowest associated time stamp value for cells having a destination of OP(0,1), request feature 914 for $L_C$(0,0) may place a separate request for VOPQ(0,0,0,1) as shown in FIG. 18. The two requests may indicate the time stamp value of 1 for VOMQ(0,0,0,0) and the time stamp value of 3 for VOMQ(0,0,0,1).

In some examples, request feature 914 for $L_C$(1,0) may place separate requests to match a link to forward a cell from a VOMQ at CM(1) based on the cell's associated time stamp value (ties broken arbitrarily). The separate requests may include a request to match $L_C$(1,0) to forward a cell destined for OP(0,0) and a request to match $L_C$(1,0) to forward a cell destined for OP(0,1). Since VOMQ(0,1,0,0) has a cell with the lowest associated time stamp value for cells having a destination of OP(0,0), request feature 914 for $L_C$(1,0) may place a request for VOPQ(0,1,0,0) as shown in FIG. 18. Also since VOMQ(0,1,0,1) has a cell with the lowest associated time stamp value for cells having a destination of OP(0,1), request feature 914 for $L_C$(1,0) may place a separate request for VOPQ(0,0,0,1) as shown in FIG. 18. The two requests may indicate the time stamp value of 2 for VOMQ(0,1,0,0) and the time stamp value of 4 for VOMQ(0,1,0,1).

In some examples, OM manager 144 for OM(O) may include logic and/or features to grant requests to match links to forward cells to VOPQs associated with destination OP 150s based on the cell's associated time stamp value (ties broken arbitrarily). The logic and/or features may include a grant feature 915 for OP(0,0) and a grant feature 915 for OP(0,1). Grant feature 915 for OP(0,0) may receive and grant requests to match links to forward cells to VOPQs associated with OP(0,0) and grant feature 915 for OP(0,1) may receive and grant requests to match links to forward cells to VOPQs associated with OP(0,1). Thus, as shown in the example process illustrated in FIG. 18, requests are placed to grant feature 915 for OP(0,0) and to grant feature 915 for OP(0,1).

Moving to example process 18.1.1 (Grant Request for VOPQ(0,0,0,0); Grant Request for VOPQ(0,0,0,1)), grant feature 915 for OP(0,0) may grant the request for VOMPQ(0,0,0,0) based on the time stamp value of 1 indicating that a cell stored at VOMQ(0,0,0,0) is the oldest for the two requests made to grant feature 915 for OP(0,0). Also, grant feature 915 for OP(0,1) may grant the request for VOPQ(0,0,0,1) based on the time stamp value of 3 indicating that a cell stored at VOMQ(0,0,0,1) is the oldest for the two requests made to grant feature 915 for OP(0,1).

Continuing to example process 18.1.2 (Accept Grant for VOPQ(0,0,0,0)), request feature 914 for $L_C$(0,0) may accept the grant for VOPQ(0,0,0,0) based on VOMQ(0,0,0,0) having a cell associated with a lower time stamp value. Then moving to example process 18.1.2.0 (Update $L_C$(0,0) Link Status), request feature 914 for $L_C$(0,0) may update a link status for $L_C$(0,0) to indicate the $L_C$(0,0) is matched to VOMQ(0,0,0,0). The updated link status may indicate to request feature 914 for $L_C$(0,0) that no further request are needed in subsequent iterations of the process. The updated link status for $L_C$(0,0) may be maintained in a memory (e.g., memory 930) maintained at or accessible to request feature 914 for $L_C$(0,0).

Moving to example process 18.1.3 (Indicate $L_C$(0,0) Match), request feature 914 for $L_C$(0,0) may indicate to CM manager 134 for CM(0) that $L_C$(0,0) was matched to forward a cell from VOMQ(0,0,0,0). CM manager 134 for CM(0) may include logic and/or features (e.g., forward feature 816) to forward the cell stored at VOMQ(0,0,0,0) via link $L_C$(0,0) to VOPQ(0,0,0,0) at OM(0). In some examples, the cell is forwarded in response to or based on initiation of the next transfer interval.

Continuing to the second iteration at example process 18.2.0 (Request for VOPQ(0,1,0,0); Request for VOPQ(0,1,0,1), request feature 914 for $L_C$(1,0) places another set of separate requests to match a link to forward a cell from a VOMQ at CM(1). Similar to the separate requests made at example process 18.1.0, The two requests may indicate the time stamp value of 2 for VOMQ(0,1,0,0) and the time stamp value of 4 for VOMQ(0,1,0,1).

Moving to example process 18.2.2 (Grant Request for VOPQ(0,1,0,0); Grant Request for VOPQ(0,1,0,1)), grant feature 915 for OP(0,0) may grant the request for VOPQ(0,1,0,0) based on the request being the sole request made to grant feature 915 for OP(0,0). Also, grant feature 915 for OP(0,1) may grant the request for VOPQ(0,1,0,1) based on the request being the sole request made to grant feature 915 for OP(0,1).

Continuing to example process 18.2.2 (Accept Grant for VOPQ(0,1,0,0)), request feature 914 for $L_C$(1,0) may accept the grant for VOPQ(0,1,0,0) based on VOMQ(0,1,0,0) having a cell associated with a lower time stamp value. Then moving to example process 18.2.2.0 (Update $L_C$(1,0) Link Status), request feature 914 for $L_C$(1,0) may update a link status for $L_C$(1,0) to indicate the $L_C$(1,0) is matched to VOMQ(0,1,0,0). The updated link status for $L_C$(1,0) may be maintained in a memory (e.g., memory 930) maintained at or accessible to request feature 914 for $L_C$(1,0).

Moving to example process 18.2.3 (Indicate $L_C$(1,0) Match), request feature 914 for $L_C$(1,0) may indicate to CM manager 134 for CM(1) that $L_C$(1,0) was matched to forward a cell from VOMQ(0,1,0,0). CM manager 134 for CM(1) may include logic and/or features (e.g., forward feature 816) to forward the cell stored at VOMQ(0,1,0,0) via link $L_C(1,0)$ to VOPQ(0,1,0,0) at OM(0). In some examples, the cell is forwarded in response to or based on initiation of the next transfer interval.

Figure 19:
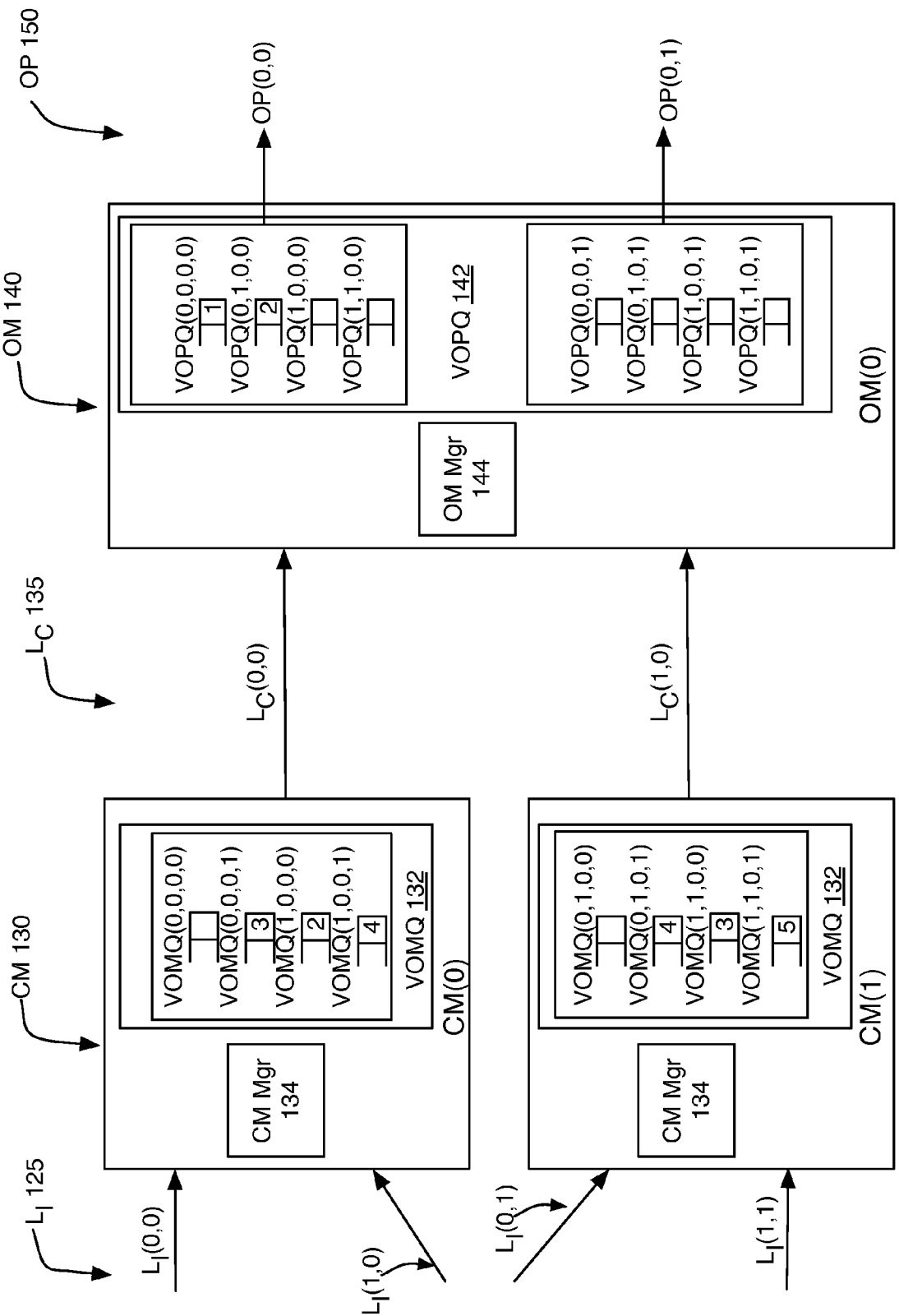
FIG. 19 illustrates an example of cells forwarded to an output module coupled to destination output ports for the three-stage Clos-network packet switch following implementation of an iterative process to match links between the output module and two central modules.

FIG. 19 illustrates an example of cells forwarded to an output module (e.g., OM(0)) coupled to destination output ports (e.g., OP(0,0) and OP(0,1)) for the three-stage Clos-network packet switch (e.g., the three-stage MMM IQC packet switch 200) following implementation of an iterative process to match links between the output module and two central modules (e.g., CM(0) and CM(1)), in accordance with the present disclosure. In some examples, the portion of switch 200 shown in FIG. 19 depicts the forwarding of cells from VOMQ(0,0,0,0) at CM(0) and VOMQ(01,0,0) at CM(1) following implementation of the example process described for FIG. 18. As shown in FIG. 19, a cell with an associated time stamp value of 1 may be forwarded to VOPQ(0,0,0,0) and a cell with an associated time stamp value of 2 may be forwarded to VOPQ(0,1,0,0).

In some examples, OM manager 144 at OM(0) may include logic and/or features configured to forward the cell stored at VOPQ(0,0,0,0) and the cell stored at VOPQ(0,1,0,0) to their destination of OP(0,0). The logic and/or features may include a forward feature 916. Forward feature 916 may be adapted to forward the cell stored at VOPQ(0,0,0,0) and the cell stored at VOPQ(0,1,0,0) based on initiation of a transfer interval and based on a cell's associated time stamp value indicating that cell is the older of the two cells (ties broken arbitrarily). Since the cell stored at VOPQ(0,0,0,0) has a time stamp value indicating an older age, this cell may be forwarded based on initiation of a transfer interval and the cell stored at VOPQ(0,1,0,0) may be forwarded based on initiation of a subsequent transfer interval.

FIG. 20 illustrates a block diagram of an example computer program product 2000. In one embodiment, as shown in FIG. 20, computer program product 2000 includes a signal bearing medium 2002 that may also include instructions 2004. In some examples, instructions 2004 may be for matching a link between an output module (e.g., an OM 140) and a plurality of central modules (CM 130s) of a three-stage MMM IQC packet switch (e.g., switch 100 or switch 200). Instructions 2004 may be executed such that partitioned data is kept in sequence as the partitioned data is forwarded from one or more queues (e.g., VOPQs) maintained at the output module to an output port (e.g., an OP 150) coupled to the output module.

Further, instructions 2004, which, when executed by logic (e.g., cell logic 910 of OM manager 144)) cause the logic to receive a request to match a link (e.g., an $L_C$ 135) between the output module and a first central module from among the plurality of central modules. The request may be associated with forwarding a first cell from among a plurality of cells to a first queue maintained at the output module. The plurality of cells may have been partitioned from data received at an input port (an IP 110) of the three-stage MMM IQC packet switch and destined for the output port coupled to the output module. In some examples, the plurality of cells may have been forwarded toward the destination output port via an input module coupled to the plurality of central modules. The request to match the link between the output module and the first central module may include an indication of an age of the first cell.

Instructions 2004 may also cause the logic to grant the request based on the indication of the age of the first cell. Also, in response to receiving an acceptance of the grant of the request, instructions 2004 may cause the logic to match the link between the output module and the first central module. As mentioned above, based on the indication of the age of the first cell and based on initiation of a transfer interval, the first cell may be forwarded over the matched link to the first queue maintained at the output module.

Also depicted in FIG. 20, some examples may include one or more of a computer readable medium 2006, a recordable medium 2008 and a communications medium 2010. The dotted boxes around these elements depict different types of mediums included within, but not limited to, signal bearing medium 2002. These types of mediums may distribute instruction 2004 to be executed by logic associated with an output module and/or a three-stage Clos-network packet switch (e.g., a three-stage MMM IQC packet switch). Computer readable medium 2006 and recordable medium 2008 may include, but are not limited to, a flexible disk, a hard disk drive (HDD), a Compact Disc (CD), a Digital Video Disk (DVD), a digital tape, a computer memory, etc. Communications medium 2010 may include, but is not limited to, a digital and/or an analog communication medium (e.g., a fiber optic cable, a waveguide, a wired communication link, a wireless communication link, etc.).

FIG. 21 illustrates an example computing device 2100 that is arranged for forwarding cells of partitioned data through a three-stage Clos-network packet switch (e.g., a three-stage MMM IQC packet switch) in accordance with the present disclosure. In a very basic configuration 2101, computing device 2100 typically includes one or more processors 2110 and system memory 2120. A memory bus 2130 can be used for communicating between the processor 2110 and the system memory 2120.

Depending on the desired configuration, processor 2110 can be of any type including but not limited to a microprocessor ($\mu$P), a microcontroller ($\mu$C), a digital signal processor (DSP), or any combination thereof. Processor 2110 can include one more levels of caching, such as a level one cache 2111 and a level two cache 2112, a processor core 2113, and registers 2114. The processor core 2113 can include an arithmetic logic unit (ALU), a floating point unit (FPU), a digital signal processing core (DSP Core), or any combination thereof. A memory controller 2115 can also be used with the processor 2110, or in some implementations the memory controller 2115 can be an internal part of the processor 2110.

Depending on the desired configuration, the system memory 2120 can be of any type including but not limited to volatile memory (such as RAM), non-volatile memory (such as ROM, flash memory, etc.) or any combination thereof. System memory 2120 typically includes an operating system 2121, one or more applications 2122, and program data 2124. Application 2122 includes three-stage Clos-network instructions 2123 that are arranged to perform the functions as described herein including the actions described with respect to the functions described for the manager architectures shown in FIGS. 6-9 or including the actions described with respect to the flow chart and process diagram shown in FIGS. 15 and 18, respectively. Program Data 2124 includes cell forwarding data 2125 that is useful for implementing instructions 2123 (e.g., maintaining time stamp values, implementing link matching, etc.). In some examples, application 2122 can be arranged to operate with program data 2124 on an operating system 2121 such that implementations of forwarding cells of partitioned data through a three-stage MMM IQC packet switch may be provided as described herein. This described basic configuration is illustrated in FIG. 21 by those components within dashed line 2101.

Computing device 2100 can have additional features or functionality, and additional interfaces to facilitate communications between the basic configuration 2101 and any required devices and interfaces. For example, a bus/interface controller 2140 can be used to facilitate communications between the basic configuration 2101 and one or more data storage devices 2150 via a storage interface bus 2141. The data storage devices 2150 can be removable storage devices 2151, non-removable storage devices 2152, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 2120, removable storage 2151 and non-removable storage 2152 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2100. Any such computer storage media can be part of device 2100.

Computing device 2100 can also include an interface bus 2142 for facilitating communication from various interface devices (e.g., output interfaces, peripheral interfaces, and communication interfaces) to the basic configuration 2101 via the bus/interface controller 2140. Example output interfaces 2160 include a graphics processing unit 2161 and an audio processing unit 2162, which can be configured to communicate to various external devices such as a display or speakers via one or more A/V ports 2163. Example peripheral interfaces 2160 include a serial interface controller 2171 or a parallel interface controller 2172, which can be configured to communicate with external devices such as input devices (e.g., keyboard, mouse, pen, voice input device, touch input device, etc.) or other peripheral devices (e.g., printer, scanner, etc.) via one or more I/O ports 2173. An example communication interface 2180 includes a network controller 2181, which can be arranged to facilitate communications with one or more other computing devices 2190 over a network communication via one or more communication ports 2182.

In some examples, computing devices 2190 may include all or at least a portion of one or more interconnected modules and/or ports included in a three-stage MMM IQC packet switch as shown in FIG. 1 (e.g., IP 110, IM 120, CM 130, OM 140, OP 150). A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

References made in this disclosure to the term "responsive to" or "in response to" are not limited to responsiveness to only a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., switches, input ports, input modules, central modules, output modules, output ports, computing device, etc) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for forwarding cells of partitioned data through a three-stage memory-memory-memory (MMM) input-queue Closnetwork (IQC) packet switch, the partitioned data received at an input port for the three-stage MMM IQC packet switch and destined for an output port for the three-stage MMM IQC packet switch, the cells stored in a virtual output queue maintained at the input port, the virtual output queue associated with the destination output port, the method comprising:

associating a first time stamp value with a first cell from among the cells and associating a second time stamp value with a second cell from among the cells, the first time stamp value to indicate the first cell is older than the second cell;

forwarding the first cell through the three-stage MMM IQC packet switch via an input module coupled to the input port, then via a first central module from among a plurality of central modules coupled to the input module and then via Q first virtual output port queue (VOPQ) maintained at an output module coupled to the first central module and coupled to the destination output port, wherein forwarding the first cell includes:

receiving a request to match a link between the output module and the first central module, and granting the request based on an indication of an age of the first cell, wherein the indication of the age of the first cell comprises the indication of the age being based on the first time stamp value associated with the first cell at the input port of the three-stage MMM IQC packet switch; and forwarding the second cell through the three-stage MMM IQC packet switch via the input module coupled to the input port, then via a second central module from among the plurality of central modules and then via a second virtual output port queue (VOPQ) maintained at the output module coupled to the destination output port, wherein the first cell and the second cell are concurrently stored at the first VOPQ and the second VOPQ, respectively, and the first cell is forwarded to the destination output port from the output module prior to the second cell being forwarded to the destination output port from the output module, wherein forwarding the second cell includes:

receiving another request to match a link between the output module and the second central module, and granting the other request based on an indication of an age of the second cell, wherein the indication of the age of the second cell comprises the indication of the age being based on the second time stamp value associated with the second cell at the input port of the three-stage MMM IQC packet switch.

2. A method according to claim 1, wherein forwarding the first cell through the three-stage MMM IQC packet switch via the input module coupled to the input port further comprises:

forwarding the first cell from the virtual output queue to a virtual central module queue maintained at the input module based on initiation of a first transfer interval;

forwarding the first cell from the virtual central module queue to a virtual output module queue maintained at the first central module based on initiation of a second transfer interval and based on the first cell's associated first time stamp value;

forwarding the first cell from the virtual output module queue maintained at the first central module to a first virtual output port queue maintained at the output module coupled to the destination output port based on initiation of a third transfer interval and based on the first cell's associated first time stamp value; and forwarding the first cell from the first virtual output port queue to the destination output port based on initiation of a fourth transfer interval and based on the first cell's associated first time stamp value.

3. A method according to claim 2, wherein forwarding the second cell through the three-stage MMM IQC packet switch via the input module coupled to the input port further comprises:

forwarding the second cell from the virtual output queue to the virtual central module queue maintained at the input module based on initiation of the second transfer interval;

forwarding the second cell from the virtual central module queue to a virtual output module queue maintained at the second central module based on initiation of the third transfer interval and based on the second cell's associated second time stamp value;

forwarding the second cell from the virtual output module queue maintained at the second central module to a second virtual output port queue maintained at the output module coupled to the destination output port based on initiation of the fourth transfer interval and based on the second cell's associated first time stamp value; and forwarding the second cell from the virtual output port queue to the destination output port based on initiation of a fifth transfer interval and based on the second cell's associated second time stamp value.

4. A method according to claim 1, wherein the first time stamp value and the second time stamp value are generated based on a reference clock accessible to the input port for the three-stage MMM IQC packet switch and also accessible to other input ports for the three-stage MMM IQC packet switch, the first time stamp value and the second time stamp value generated such that the first time stamp value has a lower time stamp value than the second time stamp value.

5. A three-stage memory-memory-memory (MMM) input-queued Clos-network (IQC) packet switch comprising:

an input port configured to maintain a virtual output queue so that the virtual output queue is to store cells of partitioned data received at the input port and destined for an output port, the input port having an input port manager, wherein the input port manager and the virtual output queue are arranged in cooperation with one another to store the cells of partitioned data destined for the output port in the virtual output queue, associate a first time stamp value with a first cell from among the cells of partitioned data, associate a second time stamp value with a second cell from among the cells of partitioned data and to forward the first cell and the second cell from the virtual output queue, the first cell forwarded based on initiation of a first transfer interval, the second cell forwarded based on initiation of a second transfer interval;

an input module coupled to the input port, the input module having an input module manager configured to receive the first cell and the second cell at the input module, the input module manager also configured to forward the first cell based on initiation of the second transfer interval and based on the first cell's associated time stamp value, the input module manager also configured to forward the second cell based on initiation of a third transfer interval and based on the second cell's associated time stamp value;

a first central module coupled to the input module, the first central module having a first central module manager configured to receive the first cell at the first central module, the first central module manager also configured to forward the first cell based on initiation of the third transfer interval and based on the first cell's associated time stamp value;

a second central module coupled to the input module, the second central module having a second central module manager configured to receive the second cell at the second central module, the second central module manager also configured to forward the second cell based on initiation of a fourth transfer interval and based on the second cell's associated time stamp value;

an output module coupled to the first and the second central modules, the output module having an output module manager configured to receive and concurrently store the first cell at a first virtual output port queue (VOPQ) maintained at the output module and the second cell at a second virtual output port queue (VOPQ) maintained at the output module, the output module manager also configured to forward the first cell based on initiation of the fourth transfer interval and based on the first cell's associated time stamp value, the output module manager also configured to forward the second cell based on initiation of a fifth transfer interval and based on the second cell's associated time stamp value, wherein the first cell and the second cell are forwarded to the destination output port, the destination output port coupled to the output module; and wherein a request is received to match a link between the output module and the first central module, the request is granted based on an indication of an age of the first cell, wherein the indication of the age of the first cell comprises the indication of the age being based on the first time stamp value associated with the first cell at the input port of the three-stage MMM IQC packet switch, another request is received to match a link between the output module and the first central module, and the other request is granted based on an indication of an age of the second cell, wherein the indication of the age of the second cell comprises the indication of the age being based on the second time stamp value associated with the second cell at the input port of the three-stage MMM IQC packet switch.

6. A three-stage MMM IQC packet switch according to claim 5, further comprising:

the input module configured to maintain a virtual central module queue, wherein the input module manager and the virtual central module queue are arranged in cooperation with one another to receive the first cell and the second cell at the input module, to store the first cell and the second cell in the virtual central module queue and to forward the first cell and the second cell from the virtual central module queue;

the first central module configured to maintain a first virtual output module queue, wherein the first central module manager and the first virtual output module queue are arranged in cooperation with one another to receive the first cell at the first central module, to store the first cell in the first virtual output module queue and to forward the first cell from the first virtual output module queue;

the second central module configured to maintain a second virtual output module queue, wherein the second central module manager and the second virtual output module queue are arranged in cooperation with one another to receive the second cell at the second central module, to store the second cell in the second virtual output module queue and to forward the second cell from the second virtual output module queue; and the output module configured to maintain a first virtual output port queue and a second virtual output port queue, wherein the output module manager and the first and the second virtual output port queues are arranged in cooperation with one another to receive the first cell and the second cell at the output module, store the first cell in the first virtual output port queue, store the second cell in the second virtual output port queue, forward the first cell from the first virtual output port queue and forward the second cell from the second virtual output port queue.

7. A three-stage MMM IQC packet switch according to claim 5, further comprising:

another input port configured to maintain another virtual output queue so that the other virtual output queue is to store cells of partitioned data received at the other input port, wherein the first time stamp value and the second time stamp value are generated based on a reference clock accessible to the input port and also accessible to the other input port, the first time stamp value and the second time stamp value generated such that the first time stamp value has a lower time stamp value than the second time stamp value.

* * * * *

UNITED STATES PATENT AND TRADEMARK OFFICE
CERTIFICATE OF CORRECTION

PATENT NO. : 8,675,673 B2
APPLICATION NO. : 12/511424
DATED : March 18, 2014
INVENTOR(S) : Rojas-Cessa et al.

It is certified that error appears in the above-identified patent and that said Letters Patent is hereby corrected as shown below:

On the Title Page

Item (75), under "Inventors", in Column 1, Line 2, delete "Zigian Dong," and insert -- Ziqian Dong, --, therefor.

On Page 2, Item (56), under "OTHER PUBLICATIONS", in Column 2, Line 36, delete "Benes-Cios" and insert -- Benes-Clos --, therefor.

In the Drawings

In Fig. 5, Sheet 5 of 19, delete " " and insert -- -- , therefor. 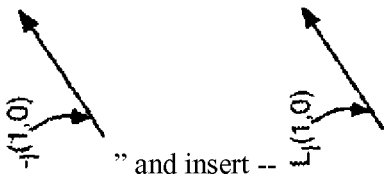

In Fig. 21, Sheet 19 of 19, in Box "(2115)", in Line 1, delete "Controler" and insert -- Controller --, therefor.

In the Specification

In Column 3, Line 52, delete "fofororwarding" and insert -- for forwarding --, therefor.

In Column 5, Line 28, delete "VOPQ 122" and insert -- VOPQ 142 --, therefor.

In Column 7, Line 34, delete "$L_($0,1)." and insert -- $L_C(0,1)$. --, therefor.

In Column 7, Line 41, delete "VOMQ 134" and insert -- VOMQ 132 --, therefor.

Signed and Sealed this
Eighth Day of July, 2014

Michelle K. Lee
*Deputy Director of the United States Patent and Trademark Office*

CERTIFICATE OF CORRECTION (continued)
U.S. Pat. No. 8,675,673 B2

In Column 11, Line 19, delete "CM 150," and insert -- CM 130, --, therefor.

In Column 14, Line 47, delete "CM manager 124" and insert -- CM manager 134 --, therefor.

In Column 14, Line 51, delete "CM(O)" and insert -- CM(0) --, therefor.

In Column 16, Line 31, delete "time stamp feature 614" and insert -- time stamp feature 612 --, therefor.

In Column 19, Line 62, delete "OM(O)" and insert -- OM(0) --, therefor.

In Column 21, Line 50, delete "144))" and insert -- 144) --, therefor.

In Column 23, Lines 36-37, delete "peripheral interfaces 2160" and insert -- peripheral interfaces 2170 --, therefor.